US008268394B2

(12) United States Patent
Sazio et al.

(10) Patent No.: US 8,268,394 B2
(45) Date of Patent: *Sep. 18, 2012

(54) FABRICATION OF METAMATERIALS

(75) Inventors: Pier John Anthony Sazio, Southampton (GB); John Victor Badding, Southampton (GB); Dan William Hewak, Southampton (GB); Steven Melvyn Howdle, Southampton (GB)

(73) Assignee: University of Southampton, Hampshire (GB)

( * ) Notice: Subject to any disclaimer, the term of this patent is extended or adjusted under 35 U.S.C. 154(b) by 1460 days.

This patent is subject to a terminal disclaimer.

(21) Appl. No.: 10/595,323

(22) PCT Filed: Oct. 8, 2004

(86) PCT No.: PCT/GB2004/004268
§ 371 (c)(1),
(2), (4) Date: Mar. 22, 2007

(87) PCT Pub. No.: WO2005/036222
PCT Pub. Date: Apr. 21, 2005

(65) Prior Publication Data
US 2007/0273055 A1 Nov. 29, 2007

(30) Foreign Application Priority Data
Oct. 10, 2003 (GB) .................. 0323807.8

(51) Int. Cl.
*B05D 5/00* (2006.01)
*B05D 5/06* (2006.01)
*B05D 7/22* (2006.01)
*B05D 3/02* (2006.01)
*B05D 3/06* (2006.01)
*H01L 21/36* (2006.01)
*H01L 21/00* (2006.01)

(52) U.S. Cl. ............. 427/230; 427/128; 427/163.1; 427/163.2; 427/282; 427/402; 427/407.1; 427/419.1; 427/419.2; 427/419.3; 427/508; 427/553; 438/478; 438/800

(58) Field of Classification Search ............. 427/162, 427/163.1, 163.2, 402, 407.1, 419.1–419.3, 427/419.5, 128, 259, 272, 282, 372.2, 376.6, 427/553, 508, 127
See application file for complete search history.

(56) References Cited

U.S. PATENT DOCUMENTS

| 5,838,868 | A | 11/1998 | Krol et al. |
| 5,894,450 | A | 4/1999 | Schmidt et al. |
| 6,001,419 | A | 12/1999 | Leluan |
| 6,496,634 | B1 | 12/2002 | Levenson |
| 6,576,345 | B1 | 6/2003 | Van Cleemput et al. |
| 7,799,663 | B2 * | 9/2010 | Anthony Sazio et al. .... 438/478 |
| 2002/0137260 | A1 | 9/2002 | Leung et al. |
| 2003/0035631 | A1 | 2/2003 | Eggleton et al. |

FOREIGN PATENT DOCUMENTS

| DE | 19701723 | 1/2002 |
| EP | 1 345 069 A2 * | 9/2003 |
| EP | 1345069 | 9/2003 |
| WO | 01/32952 | 5/2001 |
| WO | 03/058307 | 7/2003 |
| WO | 03/060442 | 7/2003 |
| WO | 03/080524 | 10/2003 |
| WO | 03/104844 | 12/2003 |

OTHER PUBLICATIONS

Copper, A. I., "Porous Materials and Supercritical Fluids," Adv. Mater. 2003, 15, No. 13, Jul. 4, 1049-1059.*
Copending U.S. Appl. No. 10/595,321, filed Apr. 7, 2006.
Larsen, Thomas Tanggaard et al. "Optical devices based on liquid crystal photonic bandgap fibres." Optics Express. 11.20 (Oct. 2003): 2589-2596.
Cooper, Andrew I. "Porous materials and Supercritical Fluids." Advanced Materials. 15.13 (Jul. 4, 2003): 1049-1059.
Eggleton, B.J. et al. "Microstructured optical fiber devices." Optics Express. 9.13 (Dec. 5, 2001): 698-713.
Watson, Michael S. et al. "Incorporation of Proteins into Polymer Materials by a Novel Supercritical Fluid Processing Method." Advanced Material. 14.24 (Dec. 17, 2002): 1802-1804.
Key, M. et al. "Propagation of Cold Atoms along a Miniature Magnetic Guide." Physical Review Letters. 84.7 (Feb. 14, 2000): 1371-1373.
Kazansky, P.G. et al. "Electrically Stimulated Light-Induced Second-Harmonic Generation in Glass: Evidence of Coherent Photoconductivity." Physical Review Letters. 78.15 (Apr. 14, 1997): 2956-2959.
Holmes, Justin D. et al. "Control of Thickness and Orientation of Solution-Grown Silicon Nanowires." Science. 287 (Feb. 25, 2000): 1471-1473.
Coleman, Nicholas R.B. et al. "The formation of dimensionally ordered silicon nanowires within mesoporous silica." Journal of the American Chemical Society. 123 (2001): 187-188.
Norris, David J. et al. "Chemical Approaches to Three-Dimensional Semiconductor Photonic Crystals." Advanced Materials. 13.6 (Mar. 16, 2001): 371-376.
Vlasov, Yu. A. et al. "Enhancement of optical gain of semiconductors embedded in three-dimensional photonic crystals." Applied Physics Letters. 71.12 (Sep. 22, 1997): 1616-1618.

(Continued)

*Primary Examiner* — William Phillip Fletcher, III
(74) *Attorney, Agent, or Firm* — Renner, Otto, Boisselle & Sklar, LLP

(57) ABSTRACT

A method of fabricating a metamaterial is provided, comprising providing a sample of engineered microstructured material that is transparent to electromagnetic radiation and comprises one or more voids, passing through the voids a high pressure fluid comprising a functional material carried in a carrier fluid, and causing the functional material to deposit or otherwise integrate into the engineered microstructured material to form the metamaterial. Many microstructured materials and functional materials can be used, together with various techniques for controlling the location of the integration of the functional material within the microstructured material, so that a wide range of different metamaterials can be produced.

52 Claims, 29 Drawing Sheets

OTHER PUBLICATIONS

Kazes, Miri et al. "lasing from semiconductor quantum rods in a cylindrical microcavity." Advanced Materials. 14.4 (Feb. 19, 2002): 317-321.

Fokine, M. et al. "Integrated fiber Mach-Zehnder interferometer for electro-optic switching." Optics Letters. 27.18 (Sep. 15, 2002): 1643-1645.

Kenis, Paul J.A. et al. "Fabrication inside microchannels using fluid flow." Accounts of Chemical Research. 33.12 (2000): 841-847.

Pavesi, L. et al., "Optical Gain in Silicon Nanocrystals." Nature. 408.6811 (Nov. 23, 2000): 440-444.

Pavesi, L. et al. "Will Silicon be the Photonic Material of the Third Millenium?" Journal of Physics: Condensed Matter. 15.26 (Jun. 20, 2003): R1169-R1196.

Butty, J. et al. "Quasicontinuous gain in sol-gel derived CdS quantum dots." Applied Physics Letters. 67.18 (Oct. 30, 1995): 2672-2674.

Wundke, K. et al. "Room-temperature gain at 1.3 µm in PbS-doped glasses." Applied Physics Letters. 75.20 (Nov. 15, 1999): 3060-3062.

Miyagi, Mitsunobo et al. "Fabrication of germanium-coated nickel hollow waveguides for infrared transmission." Applied Physics Letters. 43.5 (Sep. 1, 1983): 430-432.

Harrington, James A. et al. "A Review of IR Transmitting, Hollow Waveguides." Fiber and Integrated Optics. 19 (2000): 211-227.

Lew, Kok-Keong et al. "Template-directed vapor-liquid-solid growth of silicon nanowires." Journal of Vacuum Science Technology. B20.1 (2002): 389-392.

European Examination Report, Feb. 23, 2007, 4 pgs.

* cited by examiner

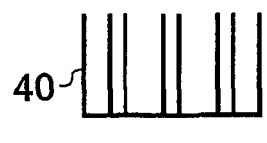
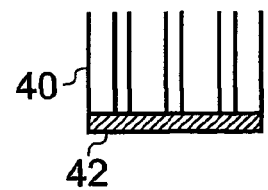
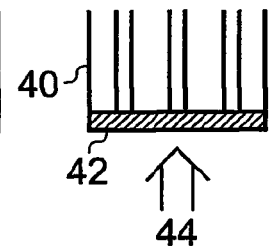
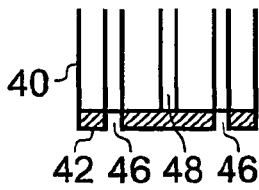
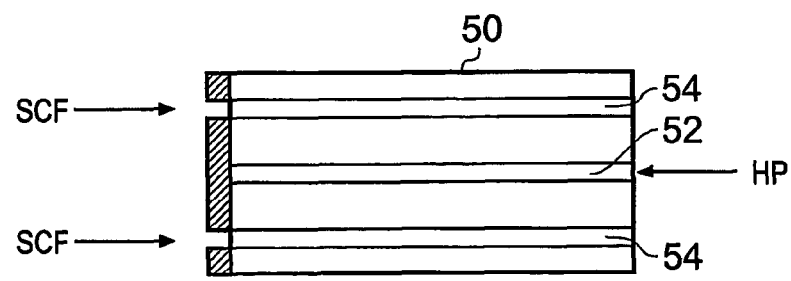
Fig. 5
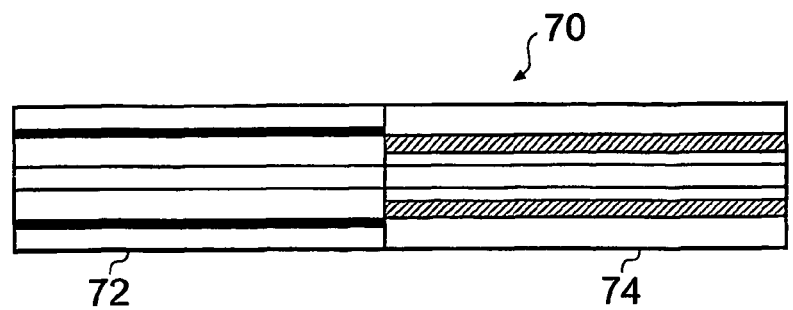
Fig. 7

FABRICATION OF METAMATERIALS

This application is a national phase of International Application No. PCT/GB2004/004268 filed Oct. 8, 2004 and published in the English language.

BACKGROUND OF THE INVENTION

The present invention relates to the fabrication of metamaterials.

Metamaterials are periodically repeating, synthetic composite structures that are specifically engineered to circumvent inconvenient bulk material properties. Photonic bandgap crystals such as synthetic opals are a subset example of metamaterials. The exceptional characteristics and response functions of metamaterials are not observed in the individual constituent materials of the composite, and these phenomena arise as a direct result of the periodic inclusion of functional materials such as metals, semiconductors or polymers embedded within the composite. However, the fabrication of such structures is a serious experimental challenge as this full three-dimensional deposition and patterning requirement is extremely difficult to satisfy using conventional techniques such as chemical vapour deposition and photolithography.

Holey optical fibres exploit the concept of using a periodic array of air holes to define the transverse refractive index profile of the fibre. These fibres have exhibited exceptional optical properties that significantly outperform conventional fibre structures in key areas, and can guide light either by a modified form of total internal reflection or by exploiting photonic bandgap effects. This has generated enormous interest both within the academic and industrial communities due to novel optical properties that include endlessly single-mode guidance, anomalous dispersion, and mode area tailoring over three orders of magnitude that have many potential applications.

The inclusion of functional materials into holey fibres and other engineered microstructured material to provide specifically tailored metamaterials is of significant technological interest as this allows easy integration into existing optoelectronic systems and devices.

Various techniques addressing this objective have been reported. For example, in an experiment to generate electrically stimulated light induced second harmonic generation in fibres with 50 µm diameter capillaries either side of a germanium-doped silica core, metal electrodes were physically inserted into the capillaries to create the required electrostatic field [1]. A similar technique was used to fabricate a magnetic field guide for atom optics formed by current carrying wires inserted into four parallel holes in the fibre [2]. A cloud of laser cooled $^{85}$Rb atoms was coupled to this fibre, and propagated over several centimeters. However, these 'bespoke' methods of fabricating composite fibre devices suffer from the obvious drawback that they are not flexible and do not readily lend themselves to large-scale production.

Other work has looked at the properties of polymers incorporated into the voids of microstructured fibres, such as an integrated all-fibre variable attenuator where the refractive index temperature dependence of a polymer introduced into the void regions of a tapered holey fibre is utilised. The polymer was infused into the structure by evacuating one end of the fibre with a pump [3].

A fibre Mach-Zehnder interferometer for electro-optic switching has been reported, in which a low eutectic temperature (137° C.) molten alloy (Bi 43%:Sn 57%) was impregnated under pressure (8 atmospheres) into a twin core optical fibre which also had two capillary channels running parallel to the cores. This pressure was sufficient to infuse 22 m of metal alloy into the fibre capillary (hole sizes ranging from 20 to 40 µm). The internal electrodes were used to apply an electric field preferentially to one of the cores to exploit its weak intrinsic Kerr non-linearity [4].

An alternative application is the inclusion of semiconductor nanomaterials such as CdSe quantum dots and rods into the cylindrical microcavity geometry of a silica capillary fibre, which points towards the potential impact this class of technologically important materials could have on microstructured fibres. The large gain magnitudes of semiconductors and their optical non-linearities have immediate applications in the fabrication of lasers, optical amplifiers, switches etc. The method currently used to impregnate cylindrical microcavities with dyes or quantum dots relies purely on the capillary action of a silica capillary when immersed in a solution of the material, and then allowing the solvent to evaporate inside the fibre [5]. This technique has several shortcomings, not least of which is the length over which material can be infused into the fibre which relies on properties such as viscosity, surface tension and glass wall adhesion characteristics of the solvent.

Related work has been performed to embed CdS quantum dots into the interstitials of a self-assembled synthetic opal by exposing the structure to a vapour of Cd and S for the growth of nanocrystals within the lattice voids [6]. This work has been extended to allow the impregnation of CdSe or Si or Ge within the opal interstitials [7]. However, the results can suffer from only partial and inhomogeneous filling of the opal's interstitial pores. Typically, in order to optimise the optical performance of these "inverted opals", the underlying silica template is dissolved away, but unless the inverted opal has been properly formed, this results in the collapse of the inhomogeneous semiconductor structure. More importantly, self-assembled structures are often not adequate for photonic devices, since the array of voids cannot be suitably controlled.

Microfabrication of structures inside capillaries has been demonstrated, using liquid flow [8]. The liquid transports reactive species to interfaces in the capillary and relies on microscopic laminar flow which allows liquid streams carrying different reagents to remain separate. The width of the separate streams thus determines the size of features that can be grown, and the resulting structures are limited in the variety and complexity of flow patterns that can form. The method is thus wholly dependent on liquid flow characteristics.

Given the importance of metamaterials and their many potential applications, there is, therefore, a need for an improved technique for their fabrication.

SUMMARY OF THE INVENTION

Accordingly, the present invention is directed to a method of fabricating a metamaterial comprising: providing a sample of engineered microstructured material comprising one or more voids and configured to transmit electromagnetic radiation; providing a high pressure fluid comprising at least one functional material carried in at least one carrier fluid; passing the high pressure fluid through the one or more voids; and causing the functional material to integrate into the engineered microstructured material to form the metamaterial.

This is a highly advantageous and beneficial way of integrating desirable functional materials with engineered microstructured materials to create metamaterials from which highly specialised devices with novel functionality and which can provide miniaturisation, robustness and other desirable features can be fabricated. That this should be possible using high pressure fluid is surprising, and results from the fact that high pressure fluids, many of which have low viscosity, high diffusivity and low or zero surface tension, can penetrate into the microstructured voids with great efficiency but at the same time carry the functional material and integrate it into the microstructured material in an even and uniform manner. The generally greater extent and particular uniformity of voids in engineered microstructured material (as opposed to self-assembled materials) means that the expected result is that the functional material would be unevenly deposited within the voids, not be carried throughout the whole extent of the voids, and be deposited in greater quantities at the void openings so that the voids would become blocked, which is undesirable in that further functional material cannot be carried to the rest of the void, and also in that the voids are often essential for the light transmitting properties of the engineered material and hence need to remain open. However, in practise this has not been observed, and instead it has been found that functional material can be deposited or otherwise integrated with great accuracy and controllability, leading to high quality metamaterials.

The invention therefore allows the many advantages of high pressure fluids to be brought to the field of optical device fabrication. The properties of high pressure fluids makes them preferable for many deposition applications compared to known techniques such as chemical vapour deposition, which is limited to depositing volatile materials. In contrast, a high pressure fluid can carry virtually any desired material. In particular, a supercritical fluid can solvate involatile materials, allowing for the use of a much wider range of materials. Extremely small scale voids (at least down to nanometer scale) can be worked upon, since high pressure fluid can have very low viscosity, and also zero surface tension, so can flow through the tiniest apertures. Also, microstructured materials such as holey fibre are ideally suited for work with such high pressure fluid, since the high tensile strength of the materials combined with the minute volumes of the voids make each void into an almost ideal high pressure microfluidic vessel in which extremely high pressures can be both tolerated and achieved while lying well within defined safety limits, since the potential energy stored is negligible thanks to the small volume. This ability to push the pressure very high while remaining safe can be achieved at low cost, and also enhances the efficiency of the integration process, since the rate of flow of the high pressure fluid can be high, to deliver a substantial amount of functional material in a short time.

In a preferred embodiment, the carrier fluid is in its supercritical phase. A supercritical fluid, that is, one that is above its critical temperature and critical pressure, is an ideal high pressure fluid for implementing the present invention, since its excellent properties include low viscosity, high diffusivity, and zero surface tension, so that a functional material can be delivered quickly and evenly. However, many fluids below their critical point, especially close to it, and particularly as regards pressure, also demonstrate the desired characteristics, so that the invention extends below the supercritical phase. This is particularly useful if a carrier fluid has a very high critical pressure or temperature, since it is not essential to achieve these conditions to apply the method. Also, the ability to operate at high pressures below the critical pressure is also advantageous as regards cost and safety. Therefore, in alternative embodiments, the high pressure fluid has a pressure of 1 MPa or above, or of 2.5 MPa or above, or of 5 MPa or above, or of 10 MPa or above, or of 25 MPa or above, or of 50 MPa or above, or of 100 MPa or above, or of 500 MPa or above, or of 1000 MPa or above, or of 2000 MPa or above.

The void penetrating ability of the high pressure fluid allows the invention to be applied to a wide range of microstructured materials having many different void sizes. Functional material can be successfully delivered to very narrow voids, and also over long distances if required, but equally over short distances. Thus, according to various embodiments, the one or more voids have a length and a width such that the ratio of the length to the width is in the range 1:1 to 10:1, or 1:1 to 100:1, or 1:1 to 1000:1, or 1:1 to 10000:1, or 1:1 to 100000:1, or 1:1 to $10^6$:1, or 1:1 to $10^7$:1, or 1:1 to $10^8$:1, or 1:1 to $10^9$:1, or 1:1 to $10^{10}$:1, or 1:1 to $10^{11}$:1, or 1:1 to $10^{12}$:1 or 10:1 to 100:1, or 10:1 to 1000:1, or 10:1 to 10000:1, or 10:1 to 100000:1, or 10:1 to $10^6$:1, or 10:1 to $10^7$:1, or 10:1 to $10^8$:1, or 10:1 to $10^9$:1, or 10:1 to $10^{10}$:1, or 10:1 to $10^{11}$:1, or 10:1 to $10^{12}$:1 or 100:1 to 1000:1, or 100:1 to 10000:1, or 100:1 to 100000:1, or 100:1 to $10^6$:1, or 100:1 to $10^7$:1, or 100:1 to $10^8$:1, or 100:1 to $10^9$:1, or 100:1 to $10^{10}$:1, or 100:1 to $10^{11}$:1, or 100:1 to $10^{12}$:1 or 1000:1 to 10000:1, or 1000:1 to 100000:1, or 1000:1 to $10^6$:1, or 1000:1 to $10^7$:1, or 1000:1 to $10^8$:1, or 1000:1 to $10^9$:1, or 1000:1 to $10^{10}$:1, or 1000:1 to $10^{11}$:1, or 1000:1 to $10^{12}$:1 or 10000:1 to 100000:1, or 10000:1 to $10^6$:1, or 10000:1 to $10^7$:1, or 10000:1 to $10^8$:1, or 10000:1 to $10^9$:1, or 10000:1 to $10^{10}$:1, or 10000:1 to $10^{11}$:1, or 10000:1 to $10^{12}$:1.

In particular, nanoscale voids can be used, which are of particular relevance for quantum confinement and the fabrication of mesomaterials. Thus, the one or more voids may have a width in the range 1 nm to 100 nm.

In addition to the wide range of void dimensions that can be accommodated and which have not previously been readily accessible for incorporating functional materials, the method is widely applicable to different types of engineered microstructured materials in general. For example, the sample of microstructured material may be elongate and the one or more voids comprises one or more elongate holes running substantially the length of the sample of microstructured material. In this, context, the sample of microstructured material may comprise a holey optical fibre. Alternatively, the sample of microstructured material may be planar. In any case, the one or more voids may have a smallest dimension between 1 nm and 1 μm. Voids on this scale are relevant in particular for the fabrication of mesomaterials, since quantum confinement can occur for suitable combinations of materials and structure sizes. Thus, in some embodiments, the engineered microstructured material, the at least one functional material and dimensions of the one or more voids are selected to give a metamaterial that is a mesomaterial. Alternatively, larger voids may be preferred for other applications, so that in some examples, the one or more voids have a smallest dimension between 1 μm and 1 mm.

In some embodiments, the sample of microstructured material is fabricated from one or more of: glass materials, plastics materials, ceramic materials, semiconductor materials and metallic materials. In some embodiments, the functional material comprises one or more of: metals, metal oxides, dielectric materials, superconductor materials, magnetic materials, ceramic materials, polymers, and biological materials. Thus, many combinations of microstructured and functional material are possible, leading to a myriad array of metamaterial devices with a huge range of features and applications. This is possible in part due to the particular nature of many high pressure fluids, which means that almost any functional material can be carried and delivered into the voids, either directly or via a precursor material.

The integration of the functional material can occur in a number of ways, depending on the nature of the microstructured and functional materials and how they interact. This further increases the range of metamaterials that can be fabricated using the present invention. In many embodiments, causing the functional material to integrate into the engineered microstructured material comprises causing the functional material to deposit on a surface of the one or more voids. Deposition of the functional material is very versatile and in many cases can be closely controlled to allow accurate tailoring of the functional material into desired structures. Control of this process includes varying of the time, high pressure flow rate, functional material concentration, and spatial definition by providing conditions for causing deposition that correspond to a desired deposition pattern. For example, the functional material may be deposited to form one or more nanoparticles on a surface of the one or more voids. Alternatively, the functional material may be deposited to form an annular layer on a surface of the one or more voids. Preferably, the method further comprises controlling the amount of functional material that is deposited to form an annular layer of a selected thickness. For example, the annular layer may comprise a thin film, or alternatively, the thickness of the annular layer may be selected to reduce the width of the one or more voids to a selected size.

For increased structural complexity, the method may further comprise providing a further high pressure fluid comprising a further functional material and passing the further high pressure fluid through the one or more voids to cause the further functional material to deposit on the functional material previously deposited. This allows layered or overlain structures to be fabricated, thus increasing the range of metamaterials that can be produced. For example, after controlling the thickness of first layer to reach a selected void size, as mentioned above, the method may further comprising providing a further high pressure fluid comprising a further functional material and passing the further high pressure fluid through the one or more voids to cause the further functional material to deposit on the functional material previously deposited, where the selected size of the one or more voids is such as to cause quantum confinement in the deposited further functional material. Nanowires and the like can thereby be fabricated using engineered materials that have a fundamental void size too large for quantum effects.

Having further regard to deposition, the functional material may be deposited on a surface of the one or more voids until the one or more voids is substantially filled with the functional material. This allows wire-like structures to be created, including nanowires if the void is suitably dimensioned for quantum confinement. Filling of voids on a larger scale may also be useful, though, such as conductive material deposited to allow electric current to be passed through the metamaterial. Further in this regard, but not limited to filling of the voids, the integrating the functional material into the engineered microstructured material may comprise depositing the functional material to create one or more quantum structures.

In some embodiments, the one or more voids comprise two or more voids, and passing the high pressure fluid through the one or more voids comprises passing the high pressure fluid through one or some of the two or more voids. Thus, the functional material is only integrated into a subset of the voids, as desired. Thus, there is a further level of versatility to the method of the present invention, giving an even greater range of possible metamaterials.

For example, the one or more voids may comprise two or more voids, the method further comprising blocking a first selection of one or some of the voids to prevent passing of the high pressure fluid so that integration of the functional material does not occur for the first selection of voids. In some embodiments this may be extended by subsequently blocking a second selection of one or some of the voids before passing a further high pressure fluid through the one or more voids, so that integration of the functional material does not occur for the second selection of voids. Further embodiments then offer the possibility of subsequently blocking further selections of one or some of the voids and passing further high pressure fluids until a desired metamaterial is achieved. Thus a great level of structural complexity can be achieved, since this process can be extended to treating every void in the sample separately, if desired. In some examples, different functional materials can be integrated into different voids, if the further high pressure fluid or fluids comprise a functional material or materials different from the said functional material comprised in the said high pressure fluid. In other examples, different amounts of the same functional material can be integrated into different voids.

Advantageously, blocking one or some of the voids comprises covering openings of the voids with a mask material and using photolithographic patterning of the mask material to unblock a selected one or more voids. Photolithography is a well-proven technique for masking small structures and providing patterning on a scale appropriate for masking individual engineered voids, which finds a useful further application in the present invention. Thus, blocking of selected voids can be performed with standard equipment, which enhances the present invention and makes fabrication of complex metamaterials readily achievable. Alternatively, blocking one or some of the voids may comprise filling the one or some of the voids with a pressurised fluid.

The method may further comprise filling the one or more voids through which the high pressure fluid is not passed with an inert pressurised fluid to substantially equalise forces within the engineered microstructured material during passing of the high pressure fluid. The very high fluid pressures which it is possible and advantageous to use in conjunction with the present invention may be detrimental to some samples of engineered microstructured materials. This embodiment of the invention provides a simple technique for preserving the structural integrity of the materials by protecting them from structural damage that may arise from unequal forces.

Integration of the functional material into the engineered microstructured material can be achieved in many ways, the choice of which will depend on factors such as the materials involved, the environmental conditions achievable, the degree of controllability needed, and the desired end result. Examples include, but are not limited to:

causing the functional material to integrate into the engineered microstructured material by heating the high pressure fluid as it passes through the one or more voids to cause the functional material to separate from the carrier fluid and integrate into the engineered microstructured material. Spatial patterning or quantity control of the integrated material can be achieved by heating the high pressure fluid by heating selected portions of the sample for selected durations to control an amount of functional material that becomes integrated. In this way, particular functional material structures can be fabricated, with precise control. For example, heating the high pressure fluid may comprise applying a temperature gradient along all or part of the sample. This allows the integration rate to be steadily increased or decreased along the sample length, which can be used to integrate a varying amount of functional material, or to compensate for any tendency for the integration to be heavier at one end of the sample than the other. The temperature gradient may be dynamically varying, or static. The choice will depend on the heating sources available, and the complexity of the gradient. According to some embodiments, heating the high pressure fluid comprises heating a portion of the sample to create a heated zone, and moving the heated zone along the sample to integrate the functional material sequentially along all or part of the sample. This allows a long region of functional material to be formed from a compact heat source, and also allows spatial patterning to be produced if the amount of heating is varied as the zone is moved, for example by moving the zone at a non-constant rate, or varying the power of the heat source. A travelling heated zone can also be employed for integration techniques using alloys. In one embodiment, the method further comprises implanting a plug of alloy-forming material in the one or more voids before passing the high pressure fluid through the one or more voids, passing the high pressure fluid through the one or more voids and allowing an alloy to form from the functional material and the alloy-forming material in the heated zone, the alloy depositing the functional material in response to the heat;

causing the functional material to integrate into the engineered microstructured material by providing a functional material that is a monomer, and providing conditions within the one or more voids under which the monomer polymerises while passing the high pressure fluid through the one or more voids to cause formation of a polymer within the one or more voids;

causing the functional material to integrate into the engineered microstructured material by altering the pressure of the high pressure fluid as it passes through the one or more voids to cause the functional material to separate from the carrier fluid and integrate into the engineered microstructured material. For some applications, causing the functional material to integrate may comprise applying a pressure gradient along all or part of the sample as the high pressure fluid is passed through the one or more voids. A pressure gradient can provide the same type of integration control as a temperature gradient;

causing the functional material to integrate by applying a gradient in concentration of the functional material in the high pressure fluid along all or part of the sample as the high pressure fluid is passed through the one or more voids. A concentration gradient can be used either alone or with other gradients.

causing the functional material to integrate into the engineered microstructured material by providing a carrier fluid that can diffuse through the engineered microstructured material, and allowing the carrier fluid to diffuse through walls of the one or more voids to leave the functional material within the one or more voids. Preferably, the carrier fluid can further diffuse through the integrated functional material. This allows continued delivery of the functional material even as the voids fill up, since the carrier fluid can continue to move away from the integration site and by replaced by fresh high pressure fluid. The same advantage can be provided if, additionally or alternatively, the functional material has a precursor form in the high pressure fluid, and causing the functional material to integrate comprises decomposing the precursor into the functional material and a by-product that can diffuse through the engineered microstructured material, and allowing the by-product to diffuse through walls of the one or more voids;

causing the functional material to integrate into the engineered microstructured material by providing a functional material that bonds with the engineered microstructured material when brought into contact by the carrier fluid;

causing the functional material to integrate into the engineered microstructured material by providing a functional material that will grow from a seed, and incorporating a seed into the one or more voids so that the functional material will grow within the one or more voids as the high pressure fluid passes through the one or more voids;

causing the functional material to integrate into the engineered microstructured material by providing a functional material that will integrate into the engineered microstructured material when exposed to energy, and exposing the high pressure fluid to energy as it passes trough the one or more voids. This is a particularly versatile technique, since it can be carefully controlled by modifying the applied energy, both temporally and spatially, to determine precisely the position and quantity of functional material that becomes integrated. Embodiments include, therefore, exposing the high pressure fluid to a spatially varying pattern of energy to cause spatially varying integration of the functional material, and/or exposing the high pressure fluid to a temporally varying pattern of energy to cause spatially varying integration of the functional material. Thus a spatial distribution of the functional material can be achieved, on a scale down to within a single void is desired. This further increases the flexibility of design of the metamaterial that is provided by the present invention. Photoinitiation can be used to cause integration in many cases, in which case the energy comprises electromagnetic radiation, although this energy has other applications for causing integration, such as heating.

Other integration mechanisms can be used as convenient, by applying conditions which cause the integration to occur to the sample as the high pressure fluid is passed through it. For any such mechanism, causing the functional material to integrate may comprise applying one or more integration-causing conditions to the sample that vary along a gradient over all or part of the sample.

In an advantageous embodiment, the method further comprises fabricating one or more further metamaterials using any of the methods presented above, and bonding the metamaterials together to create a final metamaterial. In some examples, at least two of the metamaterials are different. Additional complexity and versatility is hence provided. A variety of metamaterials can be fabricated and used as building blocks to fabricate a larger more complex device that incorporates the properties and functionality of each of its constituent parts. This is of great benefit as regards integration of different components into a single device, which is a significant goal in the optics field. Also, the resulting device can be very small, since it is based on microstructured material, which is also regarded as important for many applications.

BRIEF DESCRIPTION OF THE DRAWINGS

For a better understanding of the invention and to show how the same may be carried into effect reference is now made by way of example to the accompanying drawings in which:

FIGS. 4A, 4B, 4C and 4D show schematic representations of steps in a process of masking an end of a holey optical fibre according to embodiments of the present invention;

FIG. 5 shows a schematic representation of an embodiment of the present invention as applied to a portion of holey optical fibre;

FIG. 7 shows a representation of an example metamaterial fabricated according to an embodiment of the present invention.

DETAILED DESCRIPTION

Figure 1:
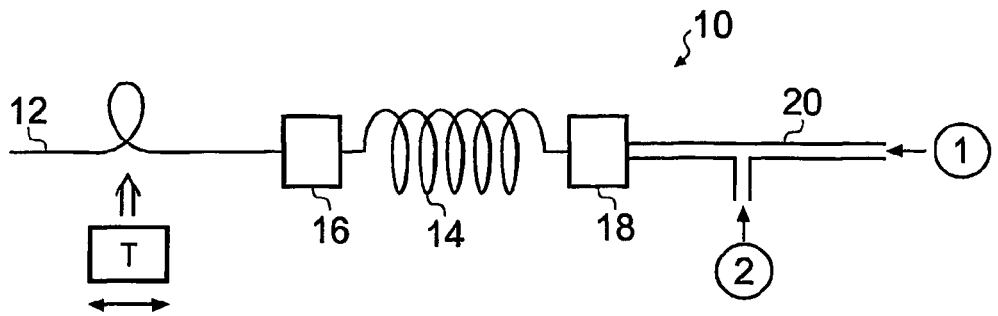
FIG. 1 shows a schematic representation of example apparatus suitable for implementing embodiments of the method of the present invention.

A supercritical fluid is a substance that has been heated and pressurised above its critical point (defined by a critical temperature and a critical pressure). Above the critical point, the substance enters the supercritical phase, where it has properties intermediate between those of a gas and a liquid. Density is similar to that of a liquid, but viscosity, diffusivity and surface tension are like those of a gas, which are typically much higher than for a liquid. Therefore, a supercritical fluid can readily penetrate porous solids. Its solvating power can be that of a liquid, however.

This combination of properties means that supercritical fluids have proved popular as solvents, with the additional benefit that many are free from the environmental and health problems of traditional organic solvents. In this regard, they are widely used in extraction processes such as the extraction of caffeine from coffee beans. Also, the solvating properties allow deposition to be performed, where the supercritical fluid carries a material to be deposited to a deposition site. For example, silicon nanowires have been grown in a supercritical solution of hexane using a diphenylsilane precursor and gold nanocrystals to seed the silicon growth [9]. This resulted in bulk quantities of 5 nm diameter silicon nanowires grown to a length of several microns. Visible photoluminescence was observed and attributed to quantum confinement techniques. Other supercritical fluid deposition work has produced silicon and germanium nanowires formed within chemically formed and self-assembled mesoporous silica templates having unidirectional arrays of pores less than 15 nm in diameter and over 1 µm in length [10]. Copper and nickel films have also been created by supercritical fluid deposition, using supercritical carbon dioxide to deposit the metals onto sub-micron lithographically patterned silicon substrates [11].

Investigation of the results of the above work has shown that supercritical deposition in these circumstances is of good quality and can offer reaction rates several orders of magnitude higher than those offered by conventional techniques such as chemical vapour deposition. However, while the resulting structures are of great interest, surface patterned substrates and self-assembled structures are of limited use for photonics applications, in which it is highly desirable that the various structured devices currently available be enhanced and engineered by the provision of additional materials.

To address this, the present invention exploits the properties of high pressure fluids, including supercritical fluids, by recognising that they can be used to great advantage to carry materials into the voids and cavities of an engineered microstructured sample, where the materials are deposited or otherwise integrated with the material of microstructured sample, with the aim of modifying the microstructured material so as to provide a new structure or new physical properties. This is a surprising result, because the assumption is that the regularity and void size particularly in terms of high aspect ratios) of engineered voids precludes quality deposition, in that deposition would be uneven and materials would not be carried along the full extent of a void.

The invention will now be described in detail. In the following description, the following terms will be used and should be understood as follows:

Microstructured material: a structured material containing voids, where the voids have smallest dimensions on the micrometer scale (1 µm to 1 mm) or nanometer scale (1 nm to 1 µm; such materials are also known as nanostructured materials).

Void: a hole, cavity, channel, capillary or similar having a smallest dimension on the micrometer or nanometer scale. Depending on the type of microstructured material, the voids may be elongate, possibly with high or extreme aspect ratios.

Engineered: the microstructured material to which the present invention is applicable is fabricated or artificially engineered so as to achieve a desired spatial structure, particularly in terms of the size, quantity, regularity and arrangement of the voids. Any arbitrary structural complexity can be achieved. This is distinct from a self-assembled material, which is chemically grown and in which it is therefore difficult to impose a specific pattern of voids, and in which the structure typically has only short range order so is unsuitable for electronic or photonic applications.

Functional material: the material to be integrated into the microstructured material. As will become apparent, a very wide range of materials are suitable, and as an aim of the integration process is to modify the functionality of the microstructured material, the generic term "functional material" will be used to indicate any of these materials.

Metamaterial: the end result of a method according to the present invention, comprising a sample of engineered microstructured material into which a functional material has been integrated.

Integrate: this is to be understood broadly, in that the mechanism by which the functional material is added to the microstructured material and "left behind" by the high pressure fluid will depend on the identity of the microstructured material and of the functional material, and also on the conditions under which the process is carried out, such as temperature, pressure, etc. Any chemical or physical reaction that can be exploited to achieve this may be used. Therefore, the term "integrate" is used to cover all possibilities, which include simple surface deposition on the surface of voids, either a thin film, a layer, complete filling of the void, or building of a specific structure such as a nanowire or other quantum structure; and integrations whereby the functional material is incorporated into the fabric of the microstructured material, such as impregnation, embedding, doping and indiffusion.

High pressure fluid: although the invention is largely concerned with using supercritical fluids to integrate the functional material, comparable results can be achieved using fluids having a temperature and/or pressure outside this regime, particularly fluids which are just below the supercritical regime, having temperatures and pressures in the vicinity of the critical point, and further using high pressure fluids in general. Therefore, the invention extends to the use of high pressure fluids in general, and is not limited to supercritical fluids. By "high pressure" it is meant that the fluid has a pressure of 1 MPa or higher. Thus, throughout this description, the term "supercritical fluid" is to be understood as including suitably high pressure fluids that may be outside of the supercritical phase, and the term "high pressure fluid" is to be understood as including supercritical fluid, unless stated otherwise.

Carried: the high pressure fluid carries the functional material into the voids of the engineered microstructured material. This can be achieved in many ways, depending on the nature of the materials involved, and how they react (or not) together. Thus the functional material may be dissolved, suspended, mixed with or otherwise incorporated; "carried" is intended to include all possibilities. Further, the functional material may be a constituent of a more complex material that is itself carried, and the functional material per se is provided by causing a reaction that liberates the functional material from the complex material, thus allowing integration to occur. This is intended to include the use of precursor materials to provide the functional material, where the precursor is carried by the high pressure fluid and once inside the voids is converted into the actual functional material which is then available for integration. The precursor decomposes into the functional material and a by-product, the functional material is integrated and the by-product removed, perhaps by being carried away by the carrier fluid. Thus, reference to the functional material being carried by the carrier fluid includes instances where the functional material has a different form when carried to the form in which it is finally integrated, as well as cases in which the functional material is carried directly in its integratable form.

For the purposes of describing the invention, holey fibre will be used as an example of an engineered microstructured material. The voids in holey fibres constitute an array of air holes that extend along the length of the fibre and define the fibre's transverse refractive index profile. Appropriate selection of the size, position and quantity of the holes is used to tailor the refractive index and give many desirable properties to the fibre such as endless single mode propagation and high nonlinearity. The holes are elongate, having diameters on the micron scale, and more recently on the nanometer scale, and lengths as long as is possible to fabricate the fibre. For the purposes of the present invention, a sample of holey fibre of a length appropriate for the device being fabricated may be used; it is expected that such lengths will typically be of millimeter, centimeter or meter dimensions, although it may be desirable in some cases to work with longer fibre lengths, such as for telecommunications applications. High pressure fluid can readily propagate along the holes for these lengths, and it has been found that the functional material carried by the fluid is evenly and uniformly deposited or otherwise integrated into the fibre material.

However, holey fibre is used here merely as an example, and it is to be understood that the invention extends to other engineered microstructured materials for optical applications, such as planar samples possibly intended as channel or other planar waveguides, or alternative elongate configurations, such as ribbon fibre arrangements containing arrays of cavities. In particular, the invention is well suited for integrating functional material into elongate voids with a high aspect ratio, since the high pressure fluid can readily penetrate into very narrow holes and still flow along the entire length of the hole. Similarly very tiny voids, with sizes on the nanometer scale, can have functional material integrated using the present invention. Thus, the voids may have dimensions such that they have a width of 1 nm to 10 nm and a similar or very much longer length, such as a ratio of length to width (aspect ratio) in the range 1:1 to 10:1, 1:1 to 100:1; 1:1 to 1000:1, 1:1 to 10000:1, 1:1 to 100000:1, and on through more extreme aspect ratios of $10^6$:1, $10^7$:1, $10^8$:1, $10^9$:1, $10^{10}$:1, $10^{11}$:1, or $10^{12}$:1. This last very extreme aspect ratio corresponds to a cross-sectional area of 1 $nm^2$ and a 1 km length. The lower end of the range may be larger than 1:1, for example it may be 10:1, 100:1, 1000:1, 10000:1 or 100000:1. However, the voids are not limited to such tiny cross-sections, and larger sizes with void widths of between 1 nm and 1 µm or between 1 µm and 1 mm are also included. For these larger sizes, the voids may have aspect ratios in a range between 10:1 and 100:1, 1000:1, 10000:1, 100000:1, $10^6$:1, $10^7$:1, $10^8$:1, $10^9$:1, $10^{10}$:1, $10^{11}$:1, or $10^{12}$:1. The lower end of the range may be defined by a high aspect ratio, such as 100:1, 1000:1, 10000:1 or 100000:1.

Also, each material is able to transmit electromagnetic radiation, i.e. is transparent to electromagnetic radiation; this is frequently achieved by the provision of the voids, although in some cases, the material may have a structure or physical nature that allows it to be transmissive, and the holes are supplemental to this, or possibly even incidental. For example, the voids may be provided specifically for integration of functional material according to the present invention, to provide functional features for a device.

A particular application of the invention is the fabrication of metamaterials that are also mesomaterials. A mesomaterial is one in which quantum effects can be exploited by structures on the nanometer scale, for example a carbon nanotube. Thus, under the correct conditions (typically a certain temperature regime) it demonstrates behaviour somewhere between nanotechnology and full quantum mechanics. Using an appropriate combination of engineered microstructured material having an array of nanoscale voids and made from a suitable material, and functional material, a metamaterial made according to the present invention can have the form of a mesomaterial. The microstructured material should have a mesoporous structure, in which the voids are small enough to contain a wavefunction so that quantum effects can be observed.

Regarding materials, many are suitable for fabrication of such engineered microstructures, and will be selected according to the intended use to which the resulting metamaterial is to be put. Examples include glass materials, plastics materials, ceramic materials, semiconductor materials and metallic materials.

Thus, a sample of engineered microstructured material, in this example a piece of holey fibre, is provided.

Secondly, the supercritical/high pressure fluid is provided, comprising a carrier fluid carrying a functional material. The term "fluid" includes liquids and gases, depending on the materials, pressures and temperatures used. Many fluids are suitable for use as a carrier fluid; all that is necessary is that the fluid can be heated and pressurised into or near to its supercritical state or phase or to a generally high pressure under conditions that can be achieved for the particular application of the present invention. For some applications an inert fluid is appropriate so that the functional material can be carried and integrated without interaction between the carrier fluid and the functional material or the carrier fluid and the microstructured material. However, in some cases such reaction might be desirable, for example to achieve a particular integration, in which case the carrier fluid can be selected accordingly. Carbon dioxide is widely used as a supercritical fluid and is suitable for use with the present invention. Also, argon, helium and hydrogen are particularly suitable for some applications. Other fluids are not precluded, however. The pressure of the fluid should be at or above 1 MPa. The choice of pressure will depend on the overall process conditions and materials, but may be in part selected with regard to the size of the voids, since higher pressures can integrate functional materials over longer distances in narrower voids. Therefore, according to various embodiments, the pressure of the high pressure fluid is at or above 2.5 MPa, 5 MPa, 10 MPa, 25 MPa, 50 MPa, 100 MPa, 500 MPa, 1000 MPa or 2000 MPa. These pressures may or may not take a particular carrier fluid into its supercritical phase. For example, the critical pressure of carbon dioxide is 7.4 MPa. It is possible to work far above the critical pressure, since this gives all the advantages of supercritical fluids plus the increased penetrating ability that comes generally with increasing the fluid pressure.

Similarly, many functional materials can be integrated using the present invention. Any material that can be suitably carried by a high pressure carrier fluid into the voids of the microstructured material, either directly or in a precursor form, can be used (although it may thus be necessary to match a particular functional material with a particular carrier fluid to obtain a chosen carrying and/or integrating mechanism). This points to the great versatility and wide applicability of the present invention; using high pressure fluids it is possible to integrate a huge range of functional materials. Possible examples of functional materials that can be used include metals, metal oxides, dielectric materials, superconductor materials, magnetic materials, semiconductor materials, ceramic materials, polymers, and biological materials. Combined with the wide range of materials from which the microstructured sample can be made, many, many different metamaterials can therefore be fabricated, that have often not previously been possible, and having an enormous number of applications.

FIG. 1 shows an example of apparatus suitable for implementing a method of fabricating a metamaterial according to an embodiment of the present invention. The apparatus 10 comprises a gas supply manifold 20 having a first inlet 1 for provision of the carrier fluid (as a liquid or a gas) from an external source and a second inlet 2 for provision of the functional material (or functional material precursor) (in a gaseous state) from an external source. The carrier fluid may initially be either at high pressure or at more modest pressures as low as just above atmospheric pressure. Measured amounts of the carrier fluid and the functional material together pass through a first high pressure valve 18 and into a closed condensor coil 14 wherein the gases are condensed by cooling the coil 14 in liquid nitrogen. This produces a condensed mixture, which may have considerably higher density than the initial densities of either the carrier fluid or the functional material/precursor. The first valve 18 is closed and the mixture is warmed to room temperature, resulting in an increase in pressure of the mixture, to the desired high pressure to form a high pressure fluid. This then leaves the coil 14 by way of a second high pressure valve 16 and passes into the voids of a sample of holey fibre 12 that is connected to the second valve 16.

In this particular example, the integration of the functional material is achieved by heat, which causes some or all of the functional material to separate from the carrier fluid (by conversion from its precursor if a precursor is used) and deposit on the inner surface of the voids of the holey fibre. Therefore, an external heat source T is arranged to apply heat to the fibre 12 so that functional material is deposited in the heated region. The remaining high pressure fluid, containing any undeposited functional material, passes along the length of the holes and leaves the holey fibre at its far end.

To achieve deposition over a long distance, the heat source T and the fibre 12 can be arranged to move relative to one another. In this way, successive portions of fibre can be heated sequentially, so that the functional material gradually deposits over the desired extent of the holes. Varying the speed of the relative movement can vary the amount of material deposited at a particular location, so that the thickness of the deposit can be controlled to build up a desired structure. Alternatively, selected regions of fibre can be heated to provide localised deposition.

This is a simple apparatus for implementing the invention, and is presented as an example only. Any apparatus by which the carrier fluid and the functional material can be suitably pressurised and then delivered to the microstructured voids can be used. Further, the external heat source T will typically only be included for those material combinations and integration mechanisms that require heat application to cause or enhance the functional material to integrate. Also, the heating may not be performed to produce high temperatures. In some embodiments, the functional material may be provided by a functional material precursor that is unstable at room temperature and thus may initially need to be at a low temperature. The heating to induce the integration then amounts to warming the high pressure fluid within the voids to room temperature, to cause instability of the precursor so the functional material is available for integration. Other examples may use cooling to achieve a similar effect. The external heat source T may be dispensed with or replaced by other apparatus as required by the integration mechanism of interest. Examples of other mechanisms are discussed later.

An alternative apparatus may be based on an autoclave arrangement. Instead of forming the high pressure fluid and injecting or otherwise flowing it into the voids of the sample, the entire sample can be immersed in the high pressure fluid within a pressure chamber. The high pressure fluid will then penetrate into every open void in the sample. Heating of the high pressure fluid within the voids to cause the integration (if such heating is necessary) can then be provided in any convenient manner, such as by inductive heating methods which can provide the necessary localised heating to limit the heating to the sample.

Continuing with the example in which the functional material deposits on the inner surface of the voids, this can generally be achieved by using a functional material precursor, and causing deposition by applying the necessary conditions to the high pressure fluid in the voids to decompose the precursor, such as heating or application of a particular chemical. The conditions will depend on the precursor. A diverse range of precursor chemistries are available for a wide variety of functional materials. Many of these chemistries have been developed for use in conventional chemical vapour deposition techniques operating at or near atmospheric pressure, but will function in a similar manner in the high pressure regime of the present invention.

Various functional material structures can be achieved using deposition of the functional material. Some deposition mechanisms are such that initially the functional material deposits as nanoparticles, which over time accumulate to form an annular layer around the inner surface of the void. The thickness of the layer builds with time, as more high pressure fluid is passed through the voids. Thus, the layer thickness can be controlled by controlling the time for which the high pressure fluid is passed (assuming that appropriate heat is applied if necessary to cause the deposition). Alternatively, a greater concentration of functional material might be provided so that more can be deposited per unit time, the flow rate of the high pressure fluid might be modified, and/or parameters that modify the rate of deposition, such as the temperature, might be adjusted. In this way, a layer of a desired thickness can be built up. Other deposition mechanisms can also be employed, such as those giving uniform film growth instead of initial deposition as particles.

Figure 2A:
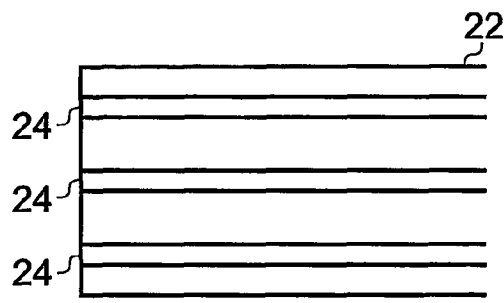
FIGS. 2A, 2B and 2C show cross-sectional views of portions of holey optical fibre with functional material integrated therein according to embodiments of the present invention.
Figure 2B:
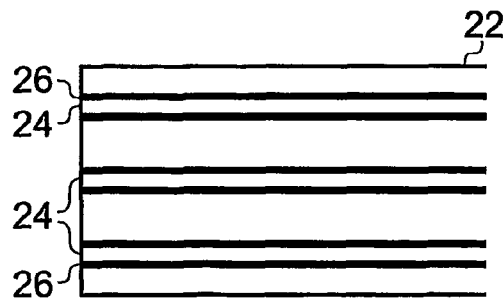
Figure 2C:
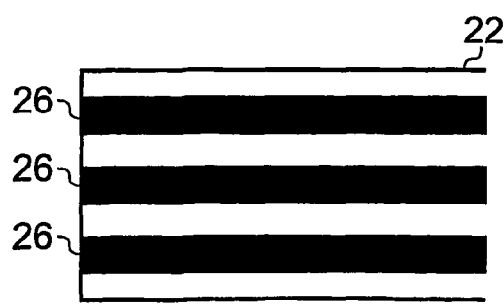

FIG. 2A shows a simplified longitudinal cross-section through an end of a holey fibre 22, showing three holes 24. FIG. 2B shows the same fibre 22 with a layer of functional material 26 deposited on the inner surface of each hole 24. The thickness of the layer might be such as to provide a thin film of functional material, for example, or a more substantial layer. Alternatively, the deposition may be allowed to continue, until the holes 24 are completely filled with functional material 26, as shown in FIG. 2C. The filling is possible because of the high diffusivity and low surface tension of the high pressure fluid, which allows it to continue to flow even where only a very small opening remains. If the functional material is a metal, this filling may be used, for example, to provide the equivalent of inserting metal wires into the holes as performed according to the prior art [1, 2]. Further, one-dimensional quantum nanowires can be created using deposition filling, if the void is small enough to provide quantum confinement of the functional material.

Figure 2D:
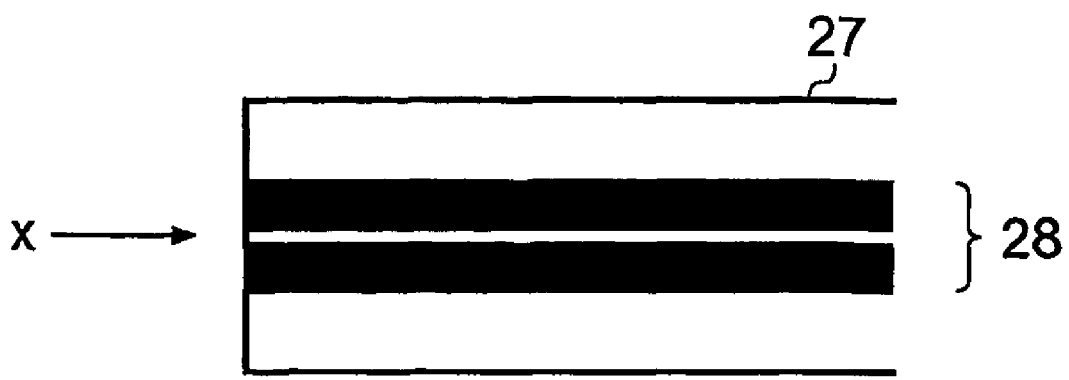
FIGS. 2D and 2E show cross-sectional views of portions of holey optical fibre with functional material integrated therein according to further embodiments of the present invention.
Figure 2E:
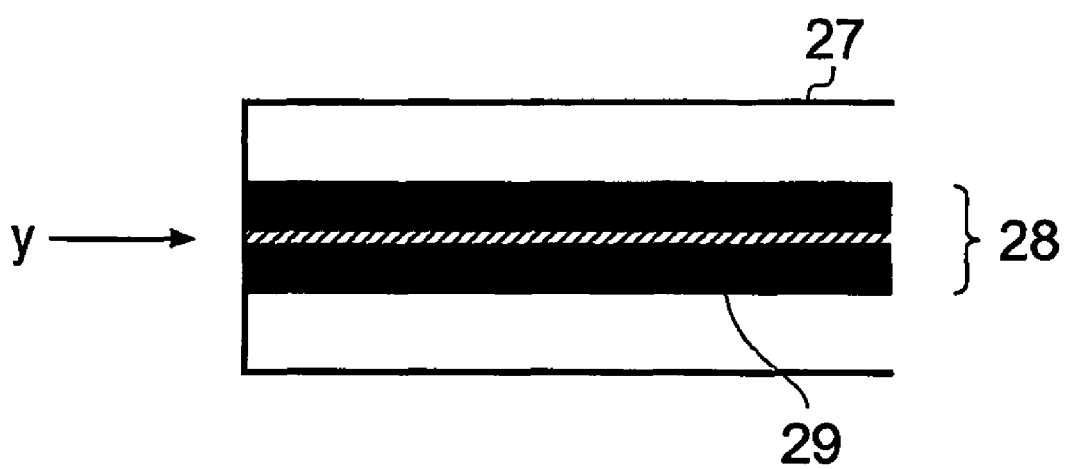

Further in this regard, controlling the thickness of the deposited layer can be used to produce a void with a particular width, since the deposition process can be considered as reducing the void width. This can be particularly useful if an engineered microstructured material with a required void size is not available or is difficult to make using conventional fabrication techniques. Also, different voids within the same sample can be tailored to different widths. This is of especial interest for nanowire fabrication, since the very small void width necessary to produce quantum confinement can be achieved by depositing a material inside a void of a width that is too large to give confinement but which is easier to engineer, to reduce the void width to the required dimension. Then, a further high pressure fluid comprising a different functional material (but possibly the same carrier fluid) is passed through the reduced void and deposited to fill the remaining space and create a nanowire. FIG. 2D shows cross-section through the end of a fibre 27 having a hole 28 that is too large for quantum confinement, but which is reduced in size by a layer of functional material X. Then, as shown in FIG. 2E, a second functional material Y is deposited to fill the void, thereby forming a nanowire 29.

Other layered structures of two or more layers or other overlain structures can be fabricated in this way, by using various high pressure fluids to deposit successive functional materials to selected thicknesses.

Regarding control of the rate of flow of the high pressure fluid, and the density, these can be increased by using higher pressures. The tiny dimensions of the microstructured voids allow extreme high pressures (thousands of atmospheres or more) to be used if desired. In the case of holey fibre, it is possible to make fibre with a tensile strength well in excess of that of steel. Combined with the small void dimensions, this means that a single hole in a fibre can be pressurised to levels of 100,000 psi or above. However, this is well within safety limits for working with high pressures (250 bar liters in the United Kingdom, for example), as the potential energy contained within the tiny volume of the hole is negligible. This greatly lowers the cost of using high pressures. Hence, higher functional material integration rates can be achieved safely and cheaply.

It has been found experimentally that good quality, even integration can be achieved without controlling parameters such as pressure gradient, ultimate temperature, concentration, temperature profile and the like. However, useful control over the physical extent of the integration can be achieved if parameters of this type are taken into account. For example, any tendency for the integration to occur such that the holes are either nearly or completely filled over a first portion and then gradually open up over the remainder of the length of the sample can be addressed by applying integration-causing conditions that vary over the length of the sample, for example conditions that vary along a gradient, to produce enhanced integration in the latter portion of the sample. This may include applying a temperature, a pressure or a concentration gradient over the sample length. A temperature gradient may be achieved statically, in that the whole sample is heated at once but to higher temperatures at one end than the other, or dynamically, by heating successive portions of the sample to ever greater or lesser temperatures (by altering the time for which heat is applied, for example). Dynamic variation of a temperature gradient applied along all or part of the sample is also possible, to cause greater or lesser integration at selected locations. The technique of heating successive portions of the sample, which can be thought of as providing a heated zone which moves along the sample, may also be applied without producing a temperature gradient. In either case, the effect is to cause the integration to progress along the sample in a sequential manner, until a desired amount of functional material is integrated. In this way, a specified quantity of functional material can be integrated over a great length of sample, up to meters and beyond. A concentration gradient relates to varying the concentration of the functional material in the high pressure fluid, for example by increasing or decreasing the concentration over time as new high pressure fluid is passed through the voids.

Figure 3A:
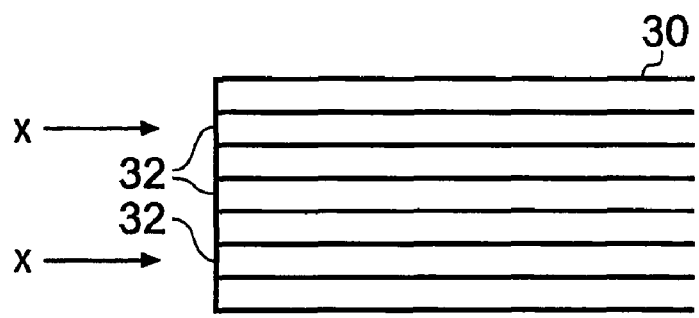
FIGS. 3A, 3B, 3C and 3D show cross-sectional views of portions of holey optical fibre with functional material integrated therein according to yet further embodiments of the present invention.
Figure 3B:
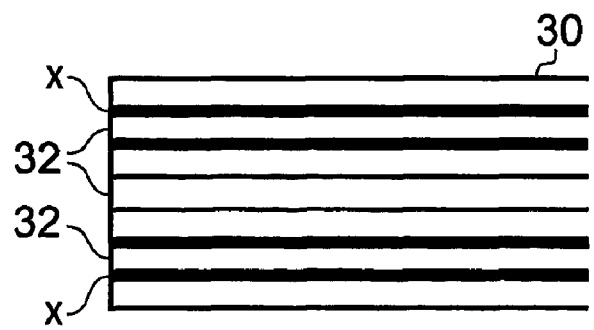

It is not necessary that the high pressure fluid be passed through every void in the microstructured material. Instead, only one or some of the voids might be exposed to a particular functional material, according to the desired end structure of the metamaterial. For example, FIG. 3A shows a longitudinal cross-section through an end of a fibre 30 in which three holes 32 are shown arranged across the diameter of the fibre 30. It is desired to deposit a functional material X in the two outside holes. Therefore, a high pressure fluid comprising the functional material X carried in a suitable carrier fluid is passed through those two holes, and not through the centre hole. This is shown in FIG. 3A, where the arrows indicate ingress of the high pressure fluid. The result is shown in FIG. 3B, in which a layer of material X has been deposited on the inner surface of the outer holes 32.

Figure 3C:
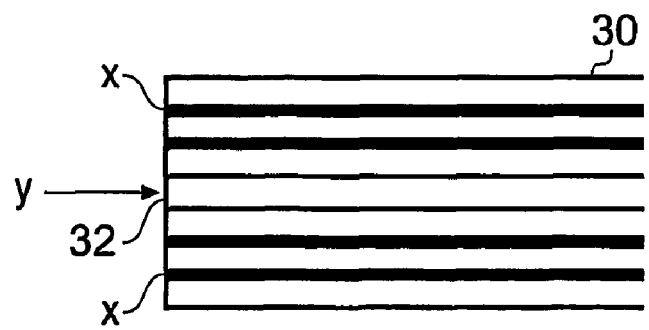
Figure 3D:
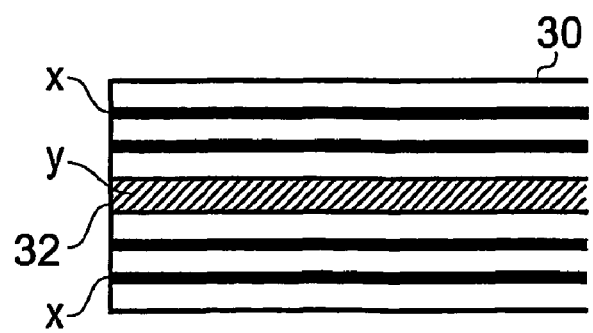

This process may be continued further, by passing other functional materials through other holes. FIG. 3C shows such a process, in which a high pressure fluid carrying a second functional material Y is passed through the centre hole 32 of the fibre 30 of FIG. 3B, until the centre hole 32 becomes filled with the functional material Y, as shown in FIG. 3D.

For microstructured samples containing further holes, this process can be repeated with further functional materials, to build up an increasingly complex metamaterial, having several integrated functional materials each with a desired thickness and in a chosen void. Alternatively, some or all of the different steps may use the same functional material, but passed for a different time or at a different concentration or rate so that layers of different thickness of the same functional material are formed in different voids.

Clearly, owing to the small size of the voids, it is generally impractical to direct the high pressure fluid into individual selected voids. A more practical approach to implementing the above process of integrating different functional materials into different voids is to block one or some of the voids, and apply the high pressure fluid to the whole sample of microstructured material, where it will then only be able to enter the unblocked voids. This may be repeated for various selections of voids, to build up the metamaterial.

Any technique by which particular selected voids may be blocked may be used to achieve this. According to one embodiment, the blocking is achieved using photolithography. This technique is commonly used to apply precise masks of a chosen pattern to semiconductor substrates and the like, and may be adapted for use with the present invention. Continuing the example of a holey fibre 40 (FIG. 4A), a layer of photolithographic mask material 42 is applied to an end facet of the holey fibre 40 (FIG. 4B). This blocks all the holes. Then, the mask material is exposed to ultraviolet light 44, the exposure having a pattern corresponding to the holes that are to remain blocked or to be unblocked (FIG. 4C). Parts of the mask material that are exposed to ultraviolet light become resistant to subsequent etching materials. Therefore, the pattern is such that the mask material covering the holes that are to be unblocked is not exposed. Finally, the mask material is exposed to an etchant that removes the unexposed mask material, and therefore opens the underlying holes 46 while leaving the remaining holes 48 blocked by mask material 42 (FIG. 4D). For subsequent blocking of other selections of holes, the remaining mask material can be removed, a new complete layer applied, and the photolithography repeated with a different ultraviolet exposure pattern.

Further blocking techniques include applying individual plugs of blocking material over the openings of those voids which it is desired to block, or filling the voids selected for blocking with a pressurised fluid that prevents any high pressure fluid from entering those voids.

Alternatively, in some embodiments where it is possible to access both ends of the voids (such as a holey fibre) the voids in which the functional material is to be deposited can be blocked from one end, instead of blocking those in which functional material is not wanted. Then, the high pressure fluid can be passed into the voids from the other end. It becomes trapped in the blocked voids and can then undergo the necessary mechanism for integration of the functional material. Meanwhile, the high pressure fluid passes straight through the unblocked voids before integration occurs. This approach is applicable in cases where the integration mechanism is such that it does not occur, or occurs little, if not trapped. For example, it could be a time-dependent mechanism where the integration occurs gradually over time, or be responsive to pressure so that trapping the high pressure fluid causes a sufficient pressure increase to initiate integration.

The fluid is at high pressure. Therefore, in the cases where it is passed through only a selection of the voids and the other voids remain empty, pressures will be unequal within the microstructured material since the unselected voids will not be equally pressurised. Depending on the pressures involved and the strength of the microstructured material, this might pose a threat to the structural integrity of the microstructured material. To address this, therefore, it is proposed according to some embodiments of the present invention to fill the voids which are not carrying the high pressure fluid with a pressurised inert fluid to equalise the pressures within the microstructured material. This might conveniently be the carrier fluid of the high pressure fluid without the functional material incorporated in it.

FIG. 5 shows a schematic representation of this, in which a portion of holey fibre 50 with three holes has one of those holes 52 blocked at one end of the fibre (for example, as described above, by using photolithography). High pressure fluid, for example, supercritical fluid (SCF), is passed through the two open holes 54 from the blocked end of the fibre, while a pressurised fluid (HP) is introduced into the blocked hole 52 from the open end of the fibre. Alternatively, the high pressure fluid can be introduced into the blocked hole 52 and the pressurised fluid be introduced into the open holes 54.

Throughout the preceding description, the example of deposition of the functional material has been used. It should be appreciated that this is merely for the purposes of explanation, and the invention is not limited to deposition. Other mechanisms by which the functional material becomes integrated into the microstructured material are possible, which can be caused to occur in various ways, via both physical and chemical mechanisms, depending on the nature of the various materials involved and the conditions under which the method is performed. For example, instead of being deposited as a surface layer, the functional material may become incorporated into the microstructured material, by impregnation, embedding, or surface in-diffusion. Any of these integration methods can be usefully achieved using high pressure fluid to carry functional material into the voids, because the highly penetrating nature of the fluid allows the functional material to be evenly carried to all parts of all the voids. Hence, any such technique is intended to be within the scope of the present invention. A number of examples will now be discussed; however, this is not an exhaustive list. Also, the various techniques may be combined to provide further control over the integration, so that very precise functional material arrangements can be fabricated.

The use of heat to cause integration by deposition had already been discussed. However, heat application is not limited to deposition. A variety of alternative integration mechanisms can be caused or modified by applying heat to the high pressure fluid as it passes through the voids (for example by heating all or part of the sample), where the action of heat has the effect of causing the functional material to separate from the carrier fluid and become integrated with the microstructured material. As for the deposition examples, heat can be applied to specific selected portions of the sample and/or for selected durations to finely control the amount of integration caused.

Polymerisation can be exploited to integrate polymer materials into the microstructured material. This can be achieved, for example, by providing a functional material in the form of a monomer. Then, as the high pressure fluid is passed through the voids, conditions necessary for causing polymerisation of the monomer can be created within the voids, so that the monomer polymerises and forms a polymer within the voids, where it is left by the carrier fluid. The conditions will depend on the nature of the monomer selected, but may include using a carrier fluid with which the monomer reacts, applying a particular temperature or pressure, or including a further catalysing fluid in the high pressure fluid.

In a further embodiment, pressure may be used to cause the integration, for example by using a combination of functional material and carrier fluid such that the two combine only under some pressure conditions. By moving away of these conditions while the high pressure fluid is passing through the voids, either by increasing or decreasing the pressure within the voids, the functional material can be made to separate from the carrier fluid and remain in the voids.

Diffusion may be used to integrate the functional material. This can be achieved by selecting a carrier fluid that can diffuse through the bulk microstructured material and a functional material that cannot, or that can only to a much lesser degree. Thus, when the high pressure fluid is introduced into a void, instead of flowing straight through and out the far end, it flows out through the side walls of the void, through the bulk material and eventually out of the sample entirely. However, the functional material cannot do this, and is left inside the void, or penetrates only a small way into the material around the void (thus providing doping of the microstructured material, for example). The void may be completely filled in this way if desired, as the carrier fluid can continue to diffuse away even when the void is blocked by the functional material, so that as much functional material as required can be delivered without the process being impeded. Preferably, therefore, the carrier fluid can also diffuse through the functional material, to facilitate its removal from the void as the functional material builds up. Diffusion may be enhanced by blocking the end of void to trap the high pressure fluid inside, so that it cannot flow directly through the void and the carrier fluid forced instead to dissipate by diffusion. Depending on how the functional material is carried in the carrier fluid, it may be necessary to provide conditions to cause decomposition of the high pressure fluid to separate the functional material from the carrier fluid so that the carrier fluid is free to diffuse. Further examples include those where a precursor is used to provide the functional material. In this case, it is further advantageous that the by-products of the decomposition of the precursor to liberate the functional material are also able to diffuse through the microstructured material. In effect, the diffusion approach can be exploited wherever the sample is made from a material through which the carrier fluid and any by-product resulting from decomposition of a precursor (in cases where a precursor is used) can diffuse. The diffusion approach addresses one of the key issues for deposition within extreme aspect ratio voids, since it finds a way to overcome the limited mass transport rate of fresh functional material or precursor to the integration zone while enabling removal of the by-products.

According to some examples, the functional material may be selected in conjunction with the material of the microstructured sample so that the functional material will adhere or otherwise physically bond to the inner surface of the voids when brought into contact therewith by the carrier fluid. The bonding mechanism might be such as to be enhanced or caused by certain physical conditions such a heat, which it will therefore be necessary to supply while passing the high pressure fluid through the voids. If the conditions can be provided locally, such as heat or light from an appropriate source, it is possible to control the integration process so that bonding only occurs in selected regions where the conditions are right.

A further integration mechanism is seeded growth of the functional material. This is of particular use in providing nanostructures of functional material such as quantum dots or wires, which can be caused to grow on a suitable seed under the correct conditions [9]. Thus, a seed is incorporated in the void, and the high pressure fluid passing through the void delivers functional material to the seed, where the functional material grows into the desired structure.

Alternatively, alloys may be used for integration involving deposition. This will typically require the use of a travelling heated zone as described above. A small amount, perhaps a plug, of a material that can form an alloy with the functional material is implanted into the void, for example by electrochemical deposition or vapour deposition. Then, the high pressure fluid is passed into the void, and the functional material forms an alloy with the alloy-forming material. Then, as more functional material is delivered, it can grow from the alloy under application of the heat, so that moving the heated zone will cause the functional material to deposit progressively along the void. The void can be filled using this technique; if the void width is small enough for quantum confinement, nanowires can be created. The alloy is preferably a eutectic alloy.

In further embodiments, integration of the functional material into the engineered microstructured material may be caused, enhanced or otherwise controlled by exposure to energy. Some deposition or other integration reactions may only occur, or may occur better or more quickly when stimulated by external energy, such as heat (as previously discussed), sound or light. For example, some reactions may be photoinitiated by exposure to electromagnetic radiation. Thus, energy can be applied to the microstructured sample as the high pressure fluid passes through the voids. The energy may be directed onto the sample from outside. Alternatively, the energy may be transmitted through the sample. This is particularly relevant for electromagnetic energy, since the sample is transparent thereto, and designed to transmit such energy.

Figure 6A:
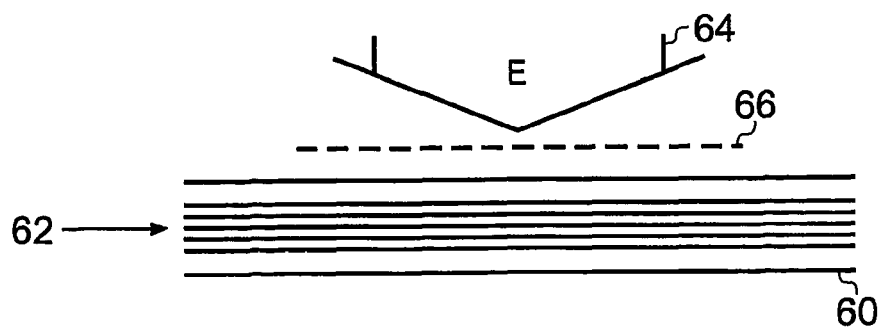
FIGS. 6A, 6B and 6C show schematic representations of further embodiments of the present invention as applied to portions of holey optical fibre.

The energy can be applied to the whole extent of the voids if desired. However, a particular application of such energy exposure is to control the position of the functional material integration, by applying the energy in a spatially varying pattern so that integration only occurs in regions of the sample exposed to the energy. This can extend to directing the energy to a single localised region only. For externally applied energy, a pattern of electromagnetic radiation can be created by directing the radiation through a phase mask, for example, or by creating an interference pattern using two interfering coherent beams. FIG. 6A is a schematic representation of the former example. A fibre 60 having a plurality of holes extending along its length has high pressure fluid 62 injected into its end to that the fluid penetrates into and passed along the holes. Simultaneously, energy E in the form of a beam of light 64 is directed through a phase mask 66 onto the side of the fibre 60 to form a pattern of light in the fibre 60.

Figure 6B:
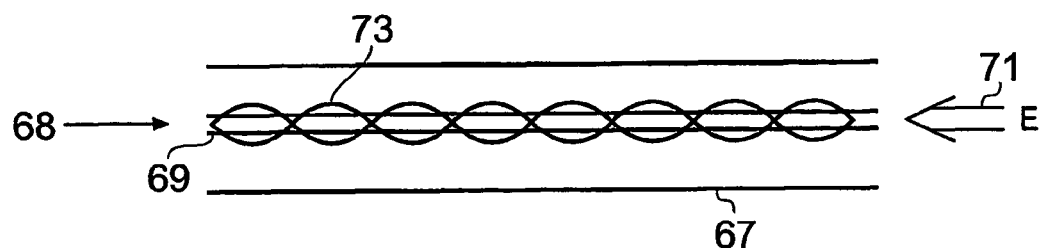

In the case of transmitted electromagnetic energy, a standing wave can be set up inside the sample (by providing back reflection at the end of sample, for example), to provide a pattern of alternating high and low intensity radiation. The integrating reaction will only occur at the antinodes of the standing wave (high intensity), so that an alternating pattern of functional material is created along the void. FIG. 6B shows a schematic representation of this. A holey fibre 67 has high pressure fluid 68 injected into a hole 69 at one end of the fibre 67, while energy in the form of a beam of laser light 71 is coupled into the other end of the fibre 67 to form a standing wave 73 along the length of the fibre, through which the high pressure fluid flows.

Figure 6C:
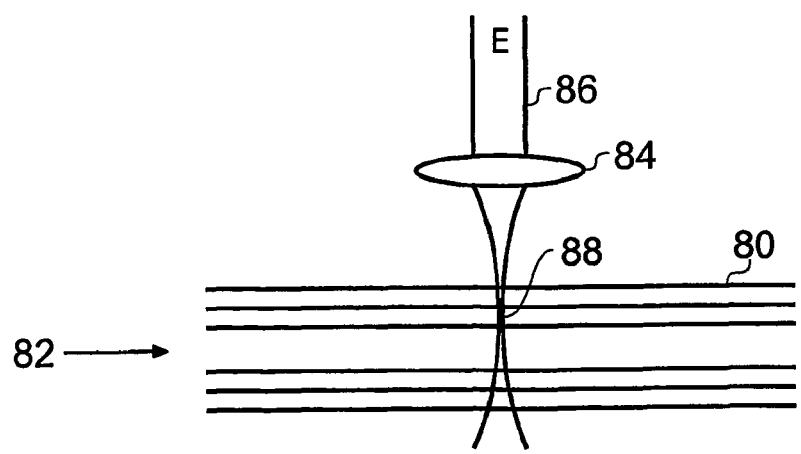
Figure 8A:
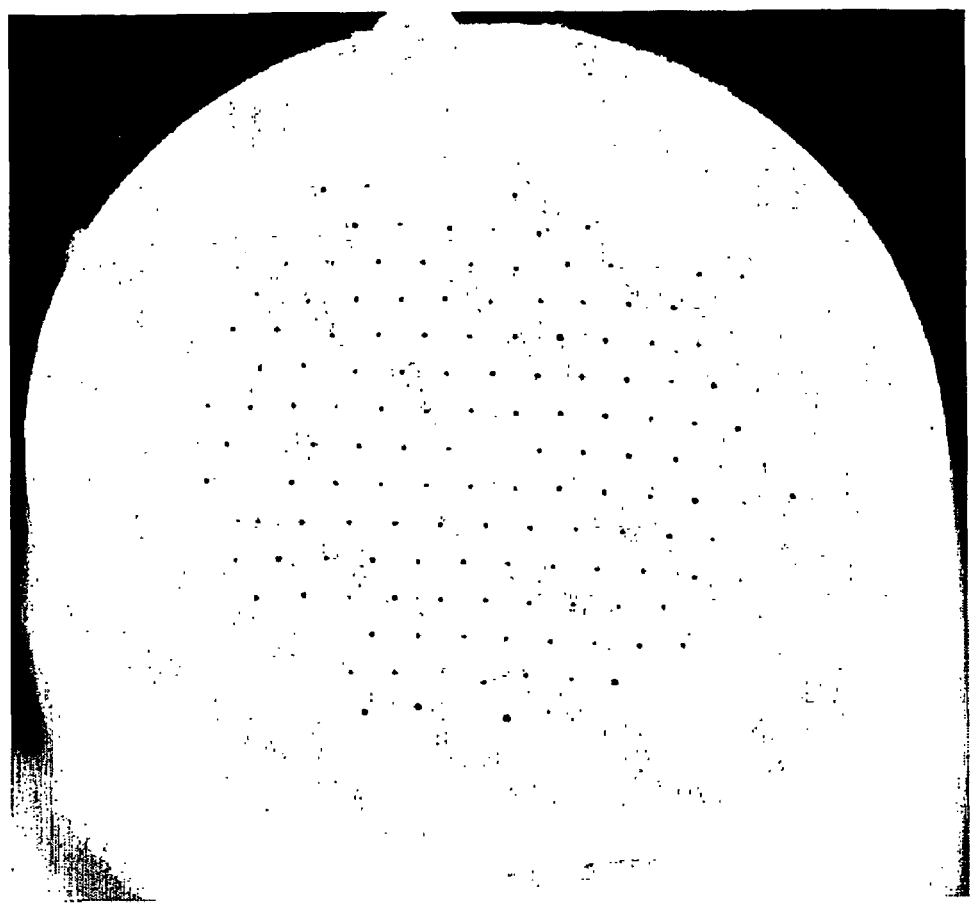
FIGS. 8A to 19C illustrate examples of the results of the use of some aspects of at least preferred embodiments of the current techniques.
Figure 8B:
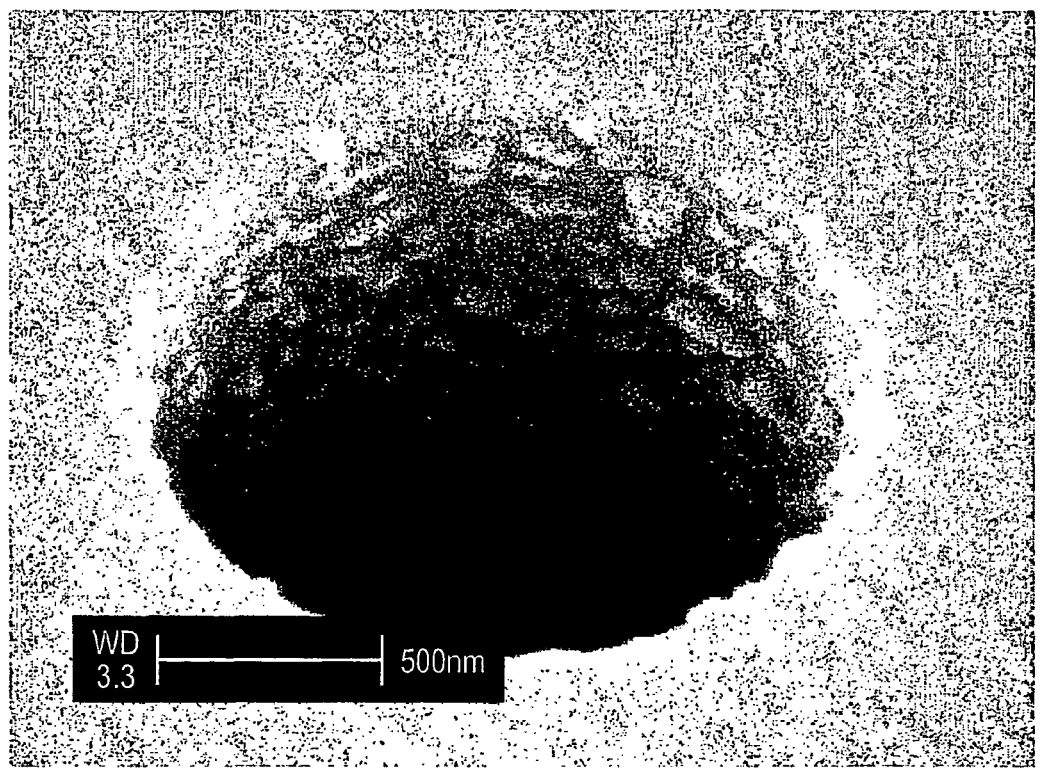
Figure 8C:
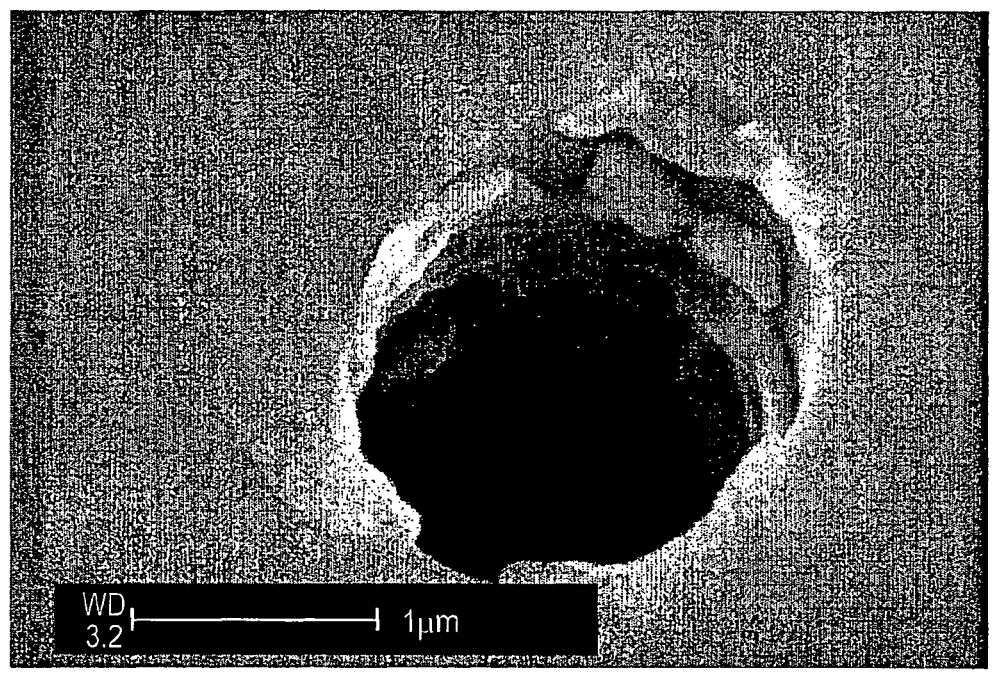
Figure 8D:
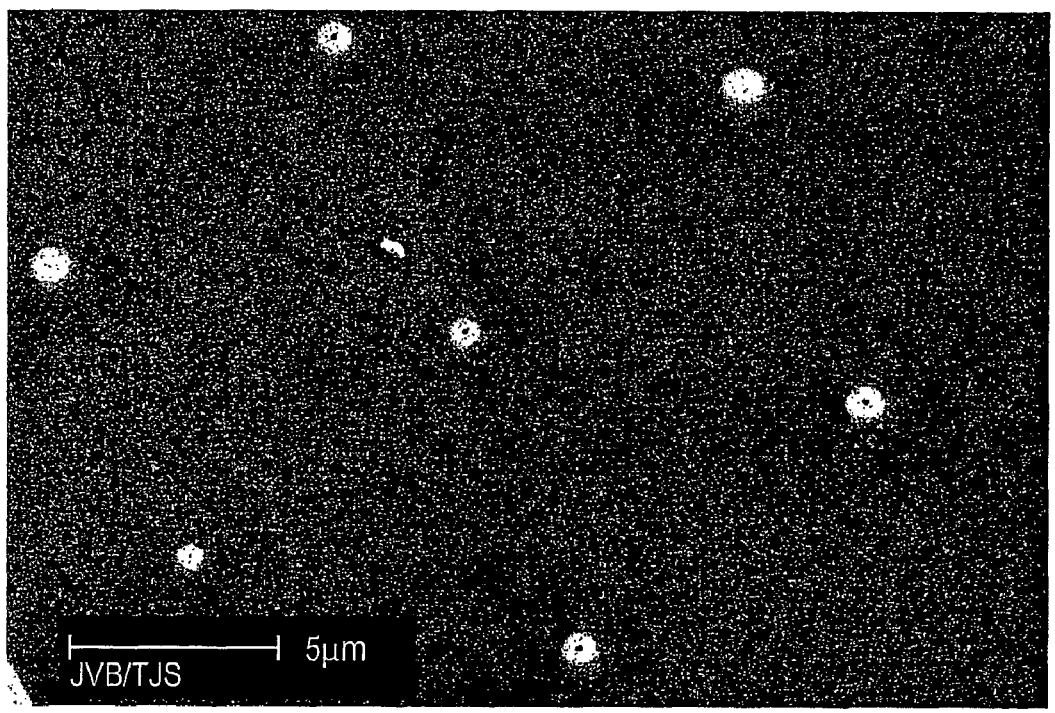
Figure 8E:
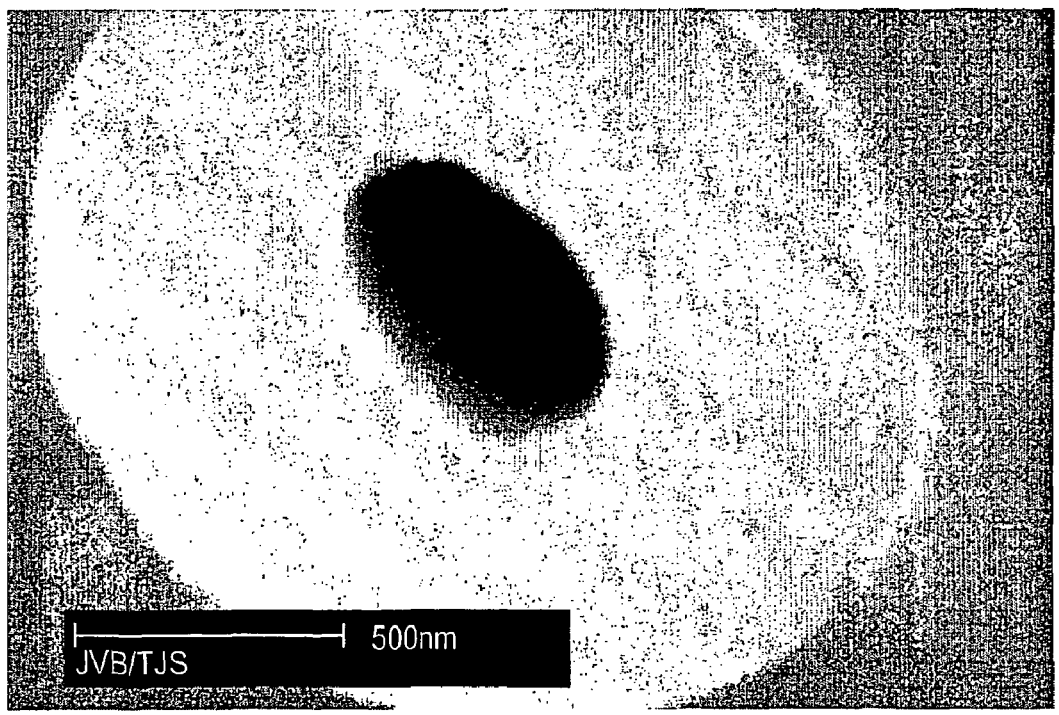
Figure 9A:
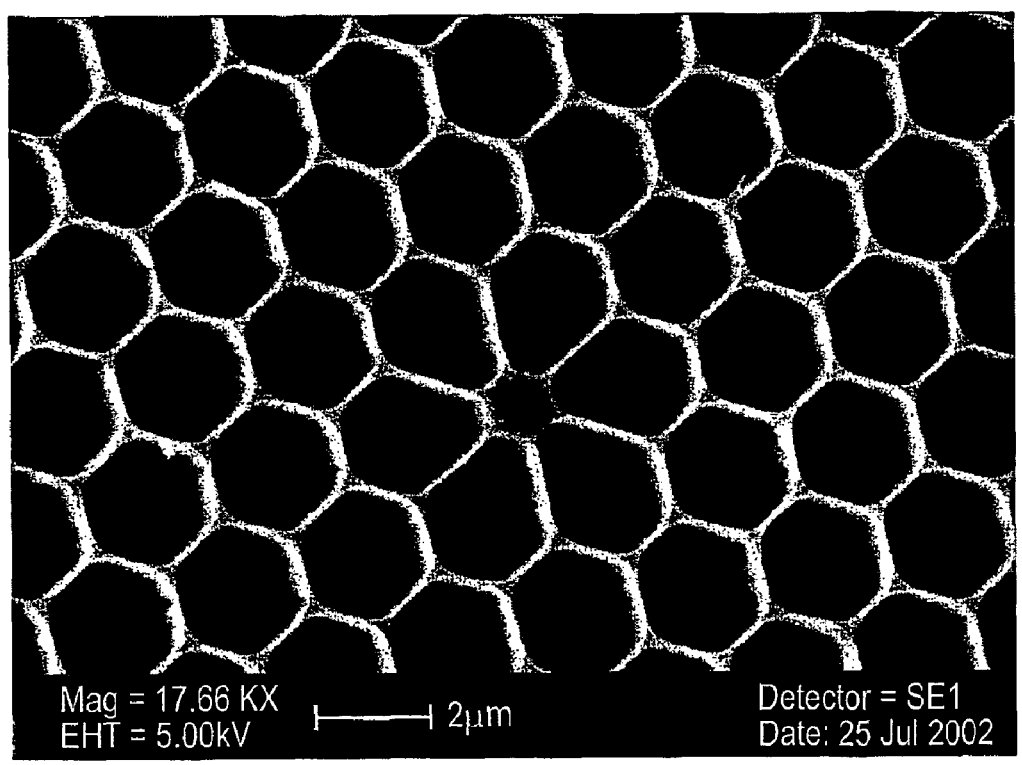
Figure 9B:
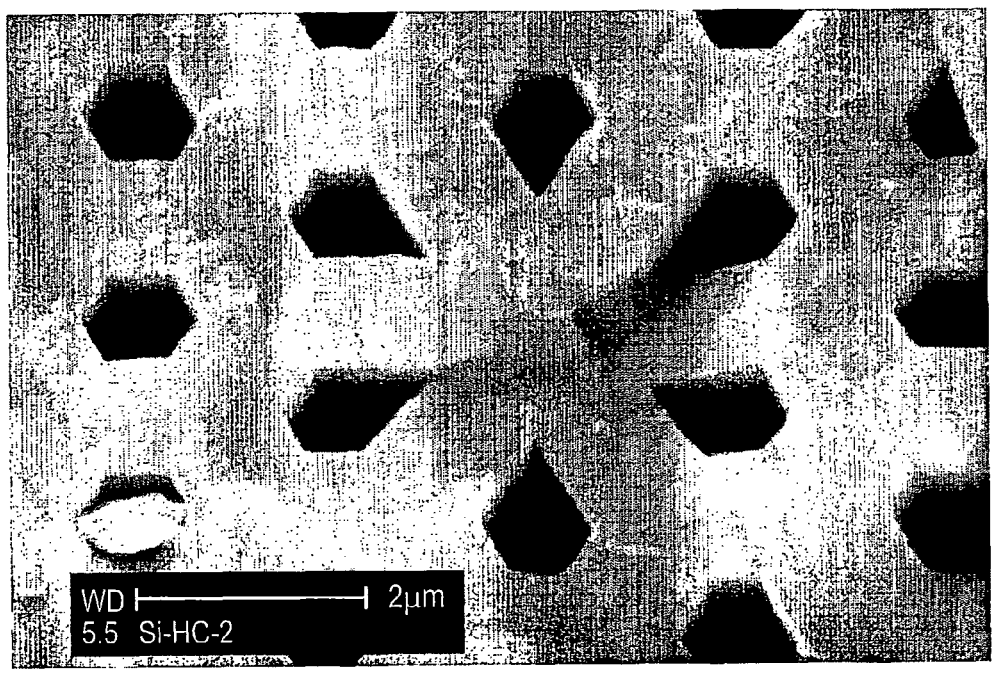
Figure 9C:
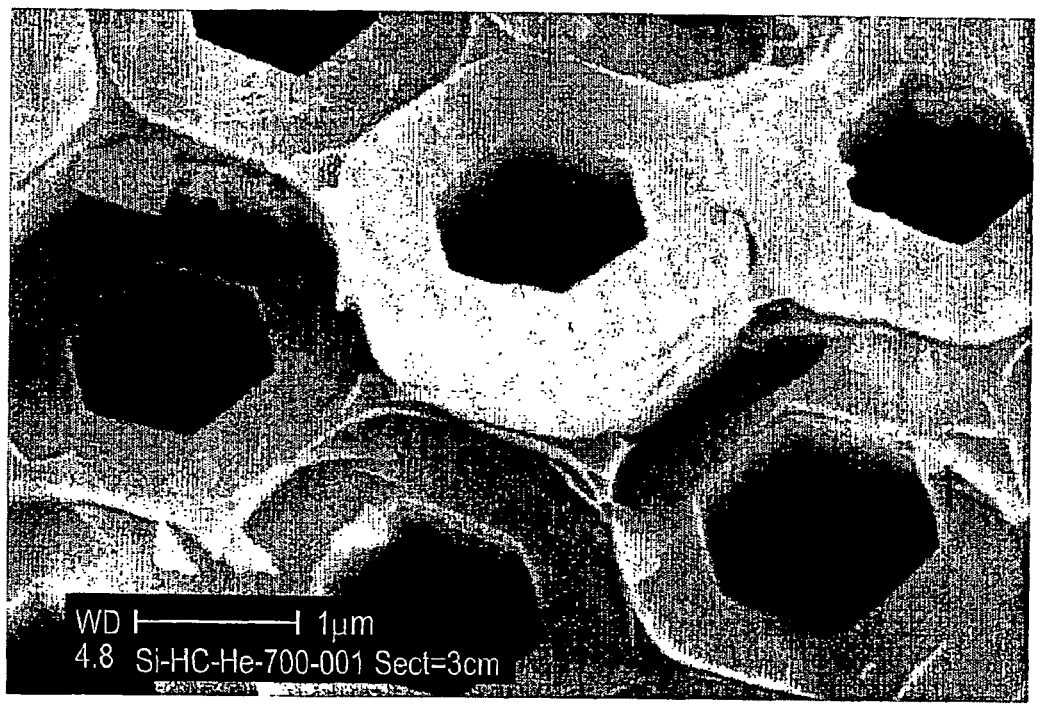
Figure 9D:
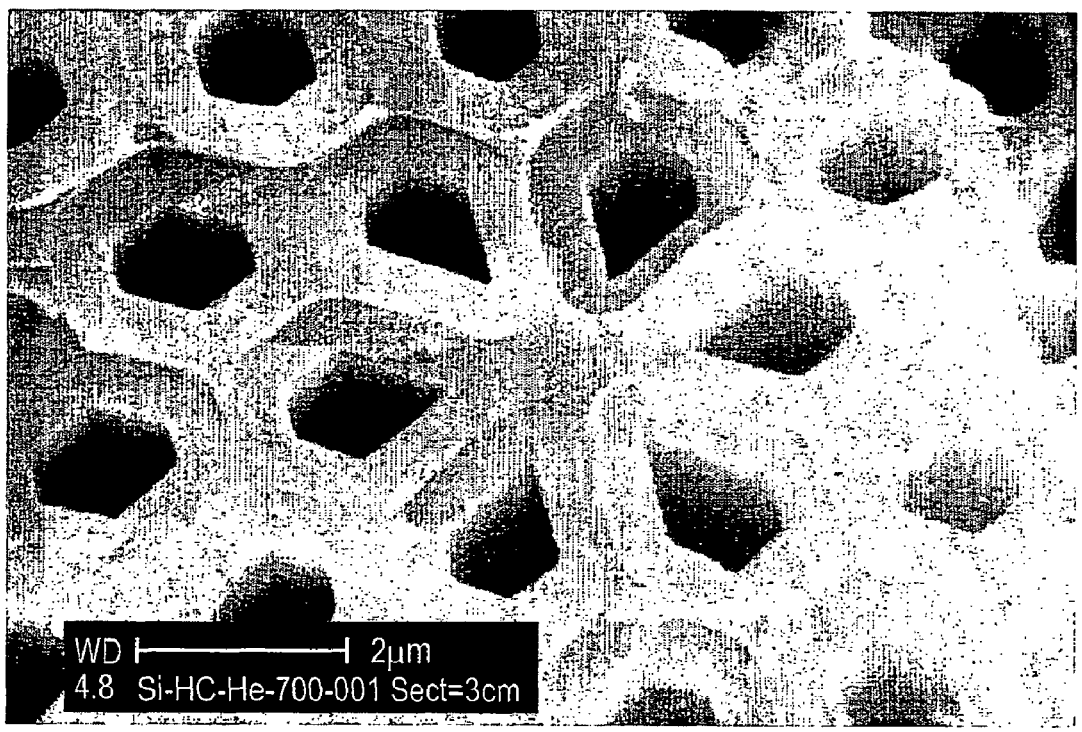

Alternatively, energy can be focussed into a specified region of the sample, for example within a single void, to provide highly localised integration. This may be used to create very finely structured features of the functional material, such as nano- or quantum structures, for instance. FIG. 6C shows a schematic representation of such an arrangement. A holey fibre 80 has a high pressure fluid directed into one end, so that the fluid flows through two holes in the fibre 80. At the same time, energy in the form of a beam of light 86 is directed onto the fibre 80 from the side, through a focussing lens 84. The lens is arranged to that the light is focussed to a focal point 88 inside one of the holes, and is unfocussed as it passes through the other hole. The focussed light is of a sufficient intensity to initiate the integration of the functional material in the high pressure fluid 82, and the unfocussed light is not, so that functional material is integrated only at the focal point.

Temporal variation of the energy may be used instead of or in conjunction with spatial variation to further control the amount and location of functional material that is integrated. For example, the intensity of the energy may be varied as the energy is scanned over the sample, or the scan speed may be varied, so that greater and lesser amounts of functional material are integrated in accordance with the amount of energy delivered to each part of the sample.

The invention is not limited to methods using a single functional material and a single carrier fluid to form the high pressure fluid. Two or more functional materials may be carried at one time in a single carrier fluid, to be integrated together. Spatial separation of the integration could be achieved if each functional material has a different condition to cause integration, such as a different temperature, and the conditions are supplied at different locations within the sample. Two or more carrier fluids might also be used together, perhaps to each carry a different functional material, or to assist in creating the conditions for integration, such as a particular chemical reaction.

In other cases, the presence of the energy might inhibit, impede or generally prevent the reaction by which the functional material is integrated, so that integration can be prevented by exposing specific regions of the microstructured material to the energy.

Further versatility in fabrication of metamaterials is offered by embodiments of the present invention. Once a metamaterial is fabricated using high pressure fluid to integrate one or more functional materials into one or more of its voids, it can be bonded to one or more further metamaterials to make a final metamaterial. The various metamaterials may have different functional materials, or the same functional material integrated via different voids, for example, to provide a more complex final metamaterial with a functional material structure that would be more complicated or even impossible to fabricate using one single sample of microstructured material. Alternatively two or more metamaterials having substantially the same structure can be bonded together to obtain a larger metamaterial than might be possible using a single sample.

FIG. 7 shows an example of a metamaterial 70 made by bonding two holey optical fibre metamaterials 72, 74 together, end to end to provide a longer waveguiding structure with discontinuous functional material structure. In this case, the hole arrangement differs in the two metamaterials 72, 74, and each has had a different functional material integrated into it via some of its holes.

FIGS. 8A to 8E illustrate the deposition of polycrystalline Germanium semiconductor via the thermal decomposition of $GeH_4$ inside a 2 micron capillary in an annular fashion over several cm in length. Raman spectroscopy confirms the crystalline nature and elemental identity of this material.

FIGS. 9A to 9D illustrate thermal decomposition of Silane inside microstructured optical fibres and demonstrate the conformal deposition of silicon (with some evidence of faceting) inside large air fraction holey fibres with of the order of micron sized holes over several cm in length. Raman spectroscopy confirms the crystalline nature and elemental identity of this material. The annular thermal decomposition of Silane to silicon inside two micron capillary fibres may also be performed.

Figure 10A:
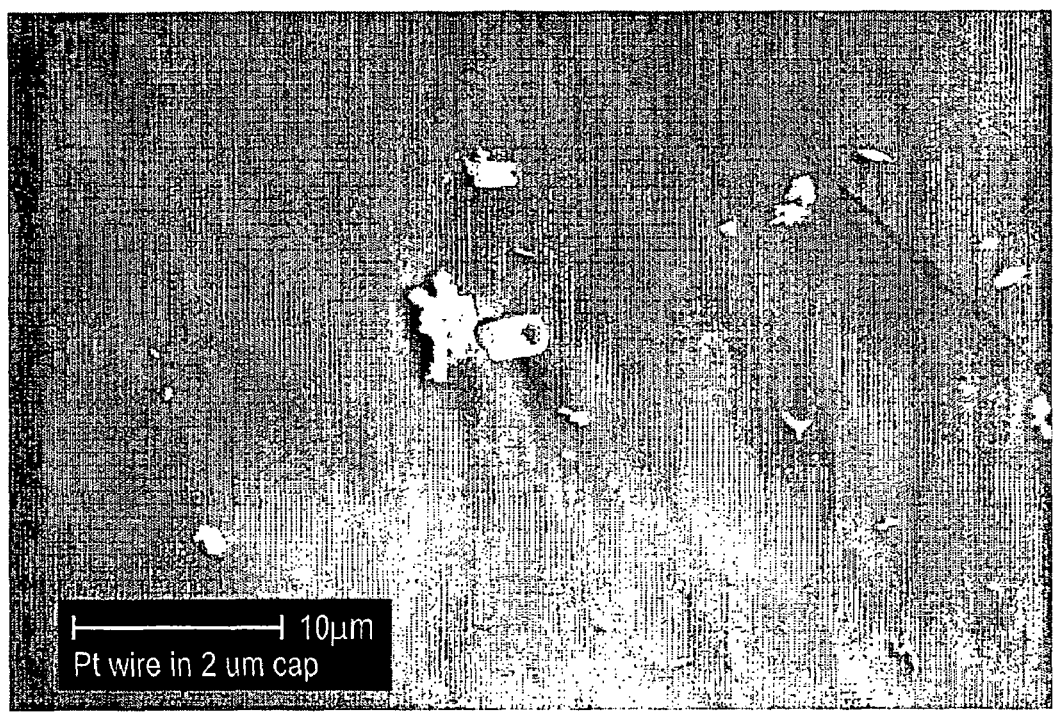
Figure 10B:
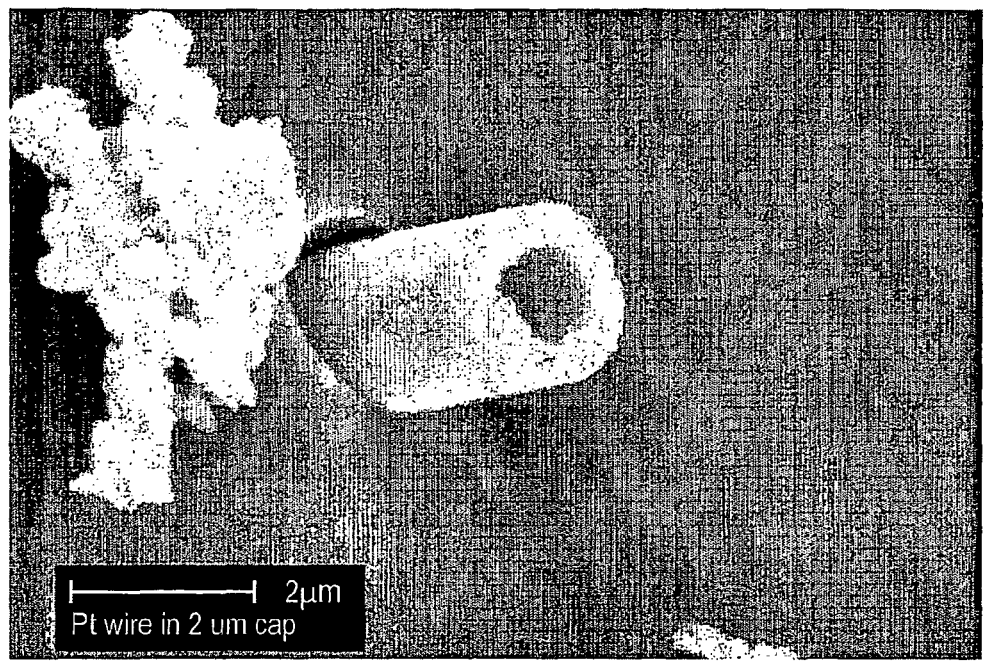

FIGS. 10A and 10B illustrate the annular deposition of Platinum metal from an organometallic precursor dissolved in $scCO_2$ inside a 2 micron silica capillary was demonstrated.

The deposition of Gold nanoparticles from an organometallic precursor dissolved in $scCO_2$ inside a 2 micron capillary fibre may also be performed.

Figure 11A:
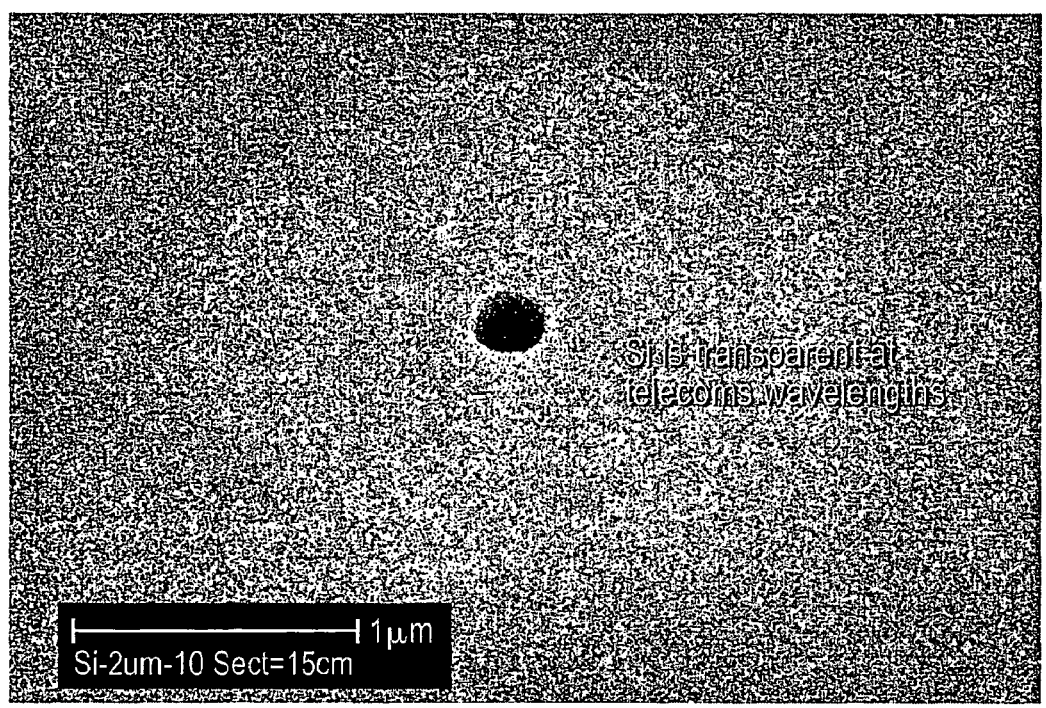
Figure 11B:
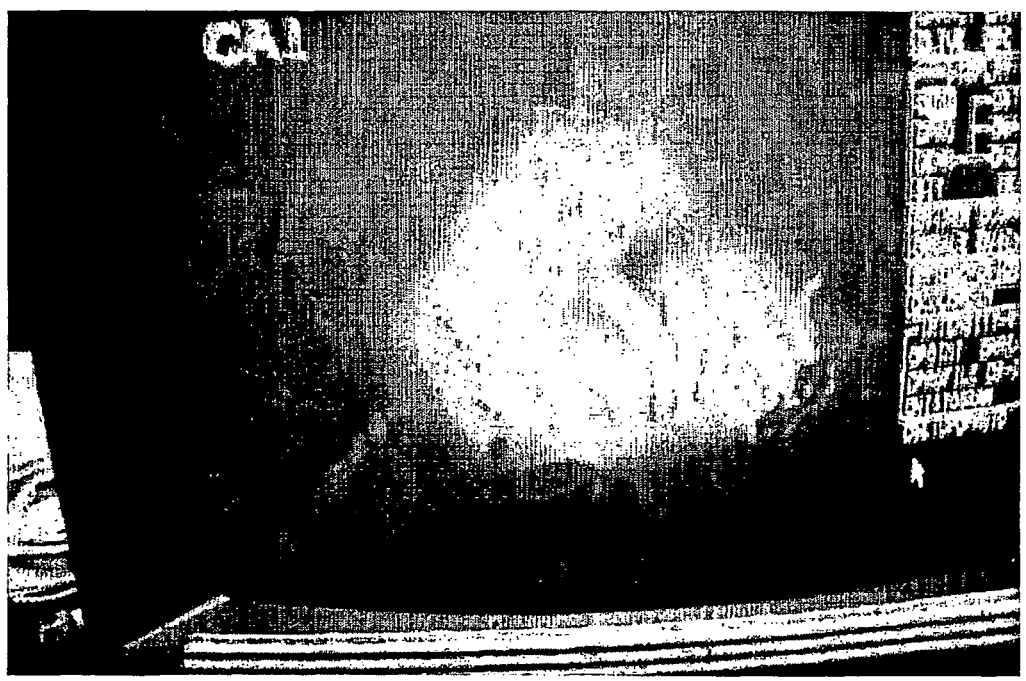
Figure 11C:
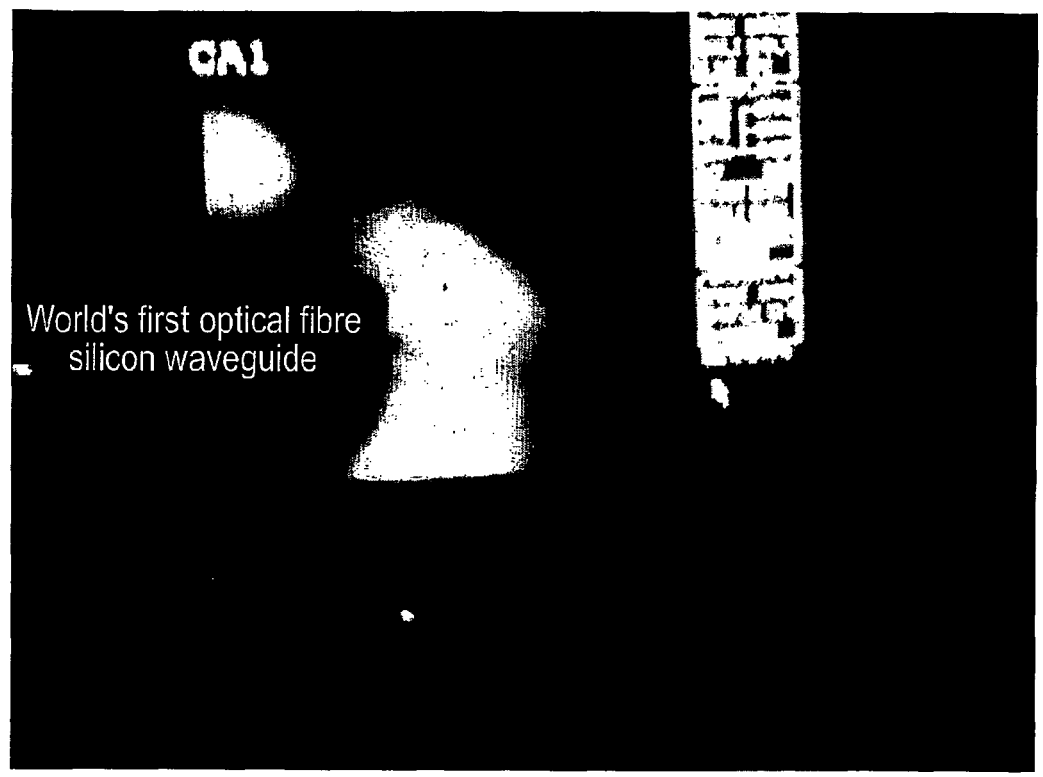

FIGS. 11A to 11C illustrate the results from butt coupling broadband ASE radiation (~1530-1570 nm, 177 mW optical power) from an EDFA into a silicon filled 2 micron capillary section approximately 7 cm long. A significant fraction of the ASE radiation is waveguided by the (multimode) silicon core, thus creating a silicon optical fibre waveguide.

Figure 12:
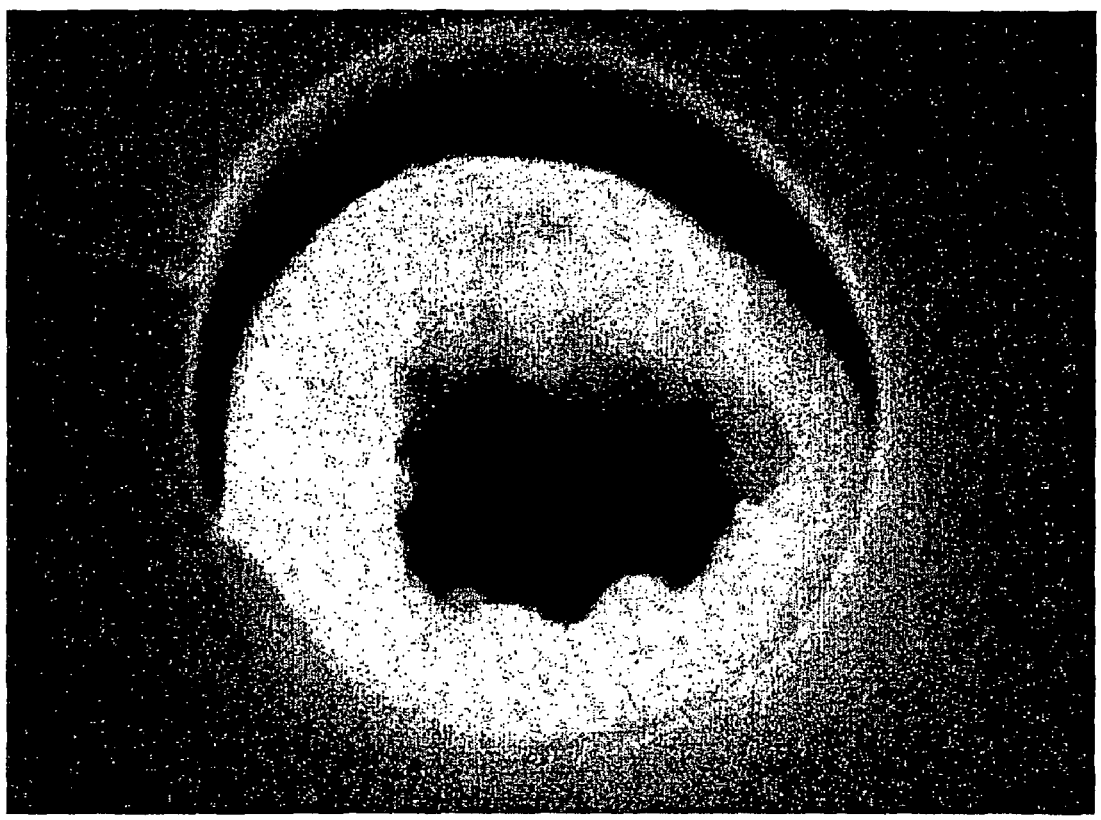

FIG. 12 illustrates the bulk deposition of gold metal in an annular fashion from an organometallic precursor dissolved in $scCO_2$ inside a 2 micron capillary fibre. This has applications in plasmonic devices such as surface enhanced Raman sensors and various sub-wavelength devices that allow the control of light via plasmonic manipulation. Fibre-based SERS sensors constructed from gold deposited within nanoscale capillary holes have the potential to detect small amounts of molecules, such as explosives and nerve agents, making them valuable for security applications. An additional advantage is that chemicals can be separated chromatographically within the fibre to allow complex mixtures to be analysed. Other applications include electrodes within fibres for exploiting electrooptic effects of co-deposited semiconductor materials, and in the longer term for the formation of ohmic contacts to electrically pumped optoelectronics such as LEDs and lasers.

Figure 13:
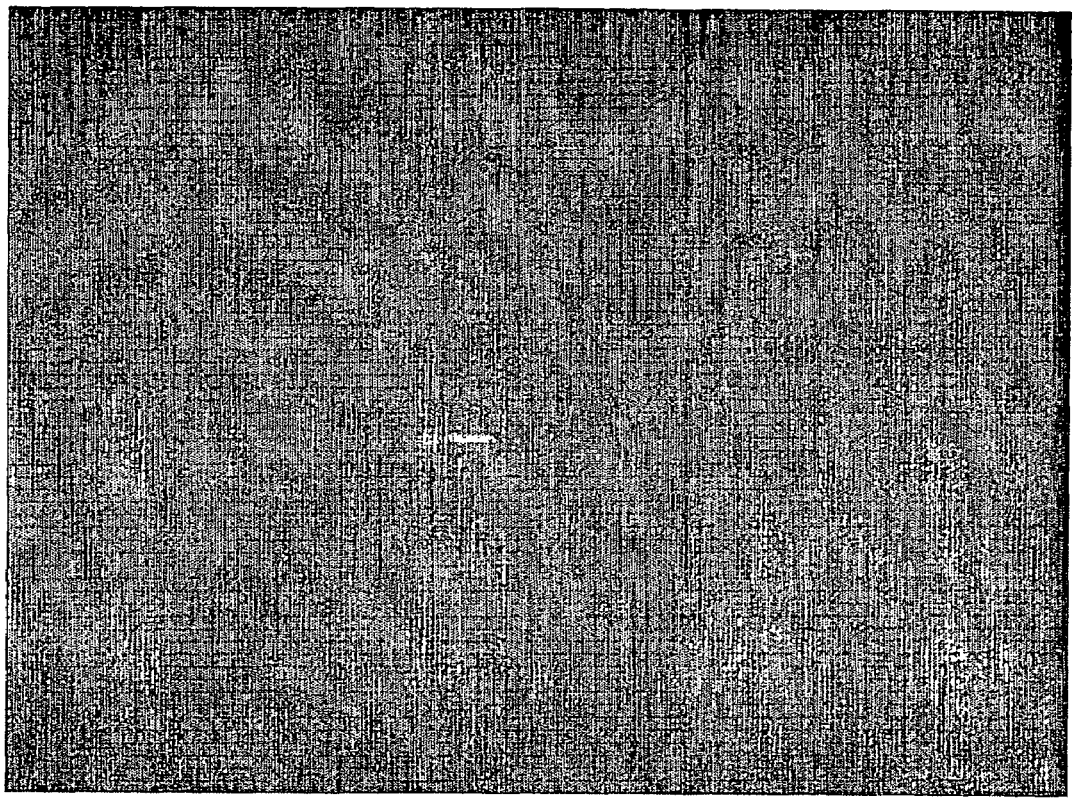

FIG. 13 illustrates the results of a 514.5 nm laser focused to a spot size of approx 2 microns as a local heating source inside a 2 micron capillary fibre. The incident laser power of 2.5 mW deposited bulk gold metal over a localised regions approx 10-20 microns long and plugged completely after 50 minutes. This demonstrates the potential for complex longitudinal/axial and radial patterning of functional materials inside optical fibre devices. Phase masking, interfering beams and multiphoton absorption may allow for the deposit of holographically defined 3D structures allowing access a large experimental parameter space.

The thermal deposition (in a furnace) of nickel from decomposition of nickelocene in super-critical fluid may be performed. The nickel can be deposited as nanoparticles on the inside walls of a 2 micron capillary. The experiment may be run for over 24 hours in a small resistive heating furnace with the result of eventually plugging up completely, implying the deposition of bulk material. Nickel can be used for seeding the growth of carbon nanotubes inside optical fibres as well as a ferromagnetic material for the fabrication of magnetooptic fibre devices such as optical isolators based on Faraday rotator effect.

Figure 14:
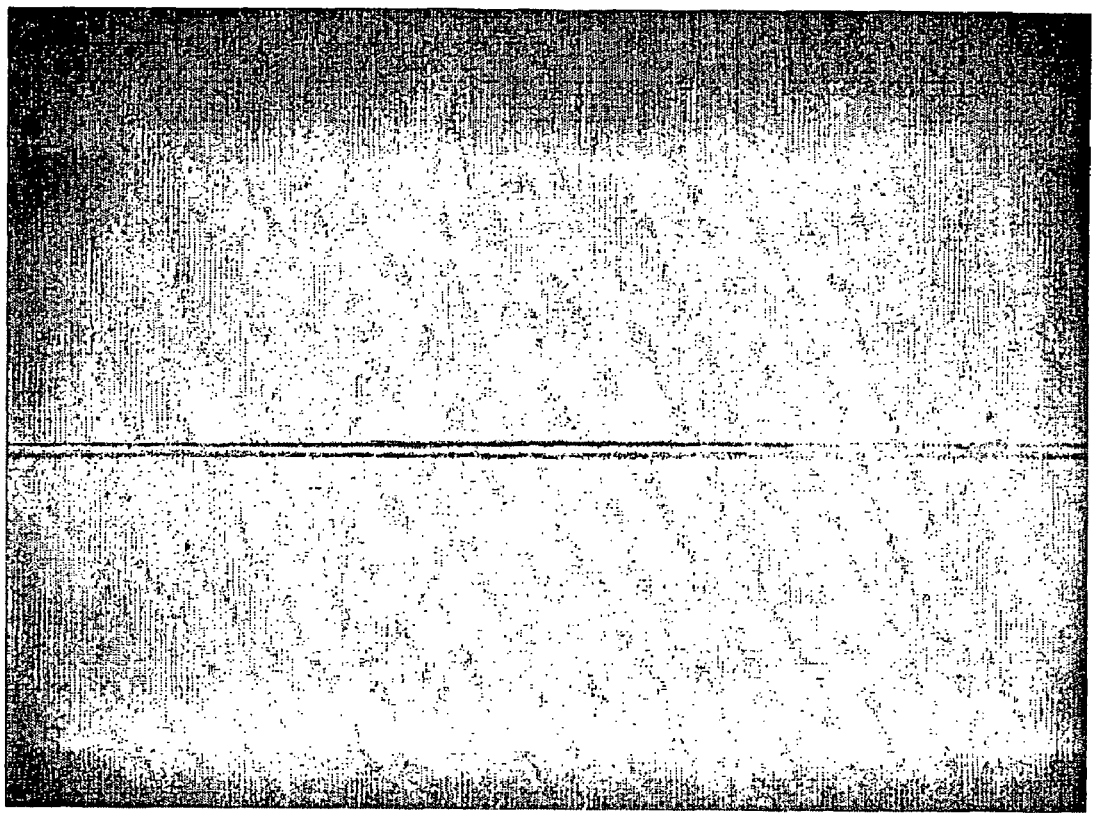

FIG. 14 illustrates the results of laser-assisted deposition of silicon inside 2 μm capillary over a localised region approximately 20-30 microns. Arsenic deposition from the thermal decomposition of Arsine inside a capillary may also be performed.

Figure 15:
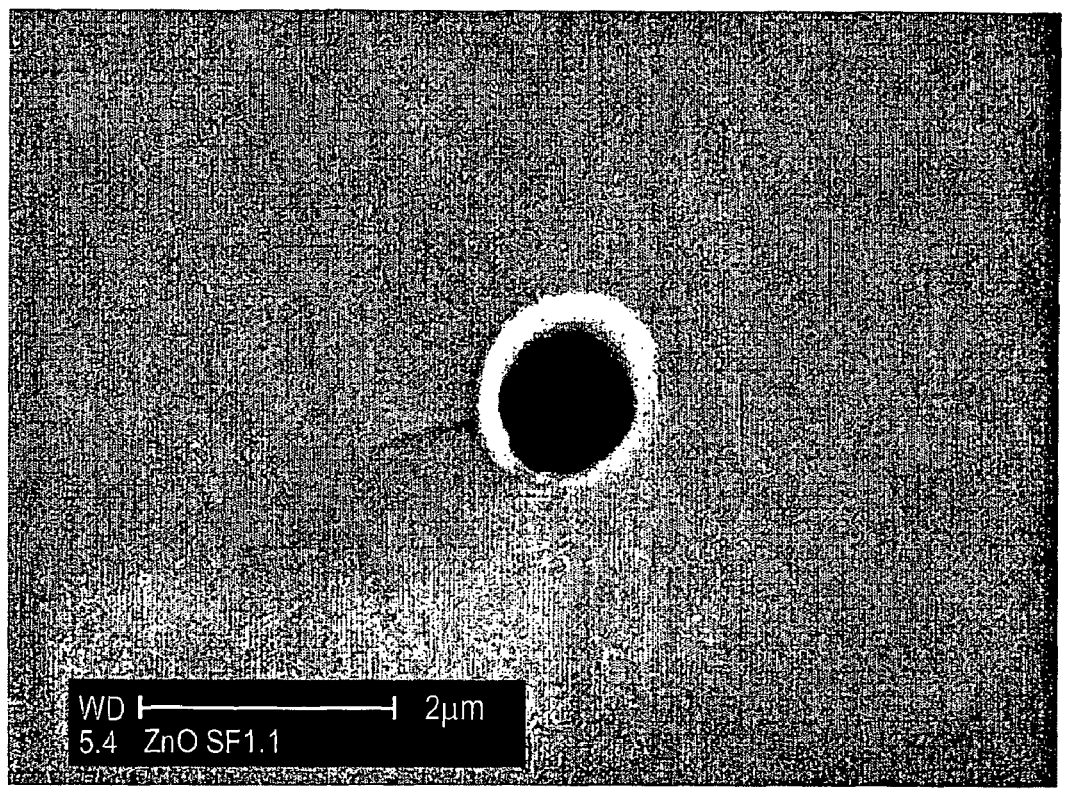

FIG. 15 illustrates the annular deposition of zinc metal from an organometallic precursor dissolved in $scCO_2$ inside a 2 micron silica capillary.

Figure 16:
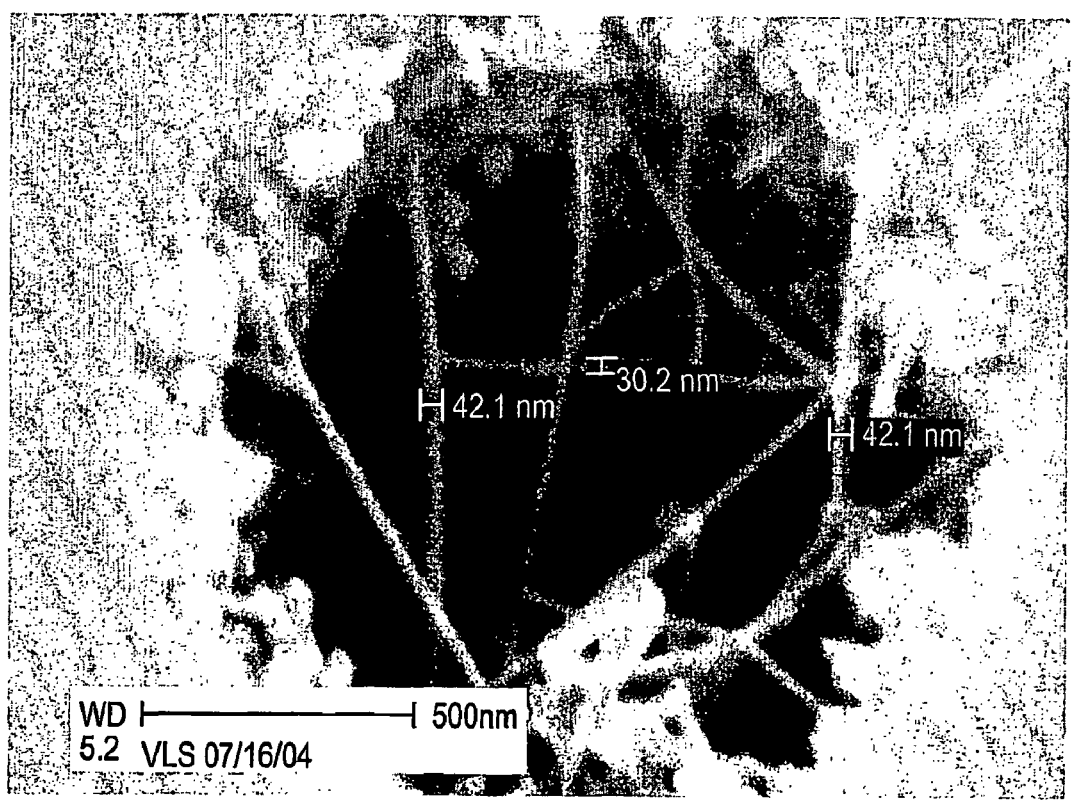

FIG. 16 illustrates the results when a fibre containing gold deposits in the centre was placed inside a furnace and attached to a reservoir containing a Silane-Helium gas mixture. The fibre was not completely plugged with gold. Only small particles of gold were inside the capillary. The gas flow rate noticeably decreased upon reaching ~360 C (eutectic temp. of Au—Si alloy). When silane is introduced into the capillary and heated, it is dissolved in the gold particles, resulting in a supersaturated alloy which then begins to grow into a single crystal silicon nanowire. The crystalline nature of the nanowires was confirmed by Raman spectroscopy. This demonstrates single crystal semiconductor growth inside an optical fibre.

Figure 17:
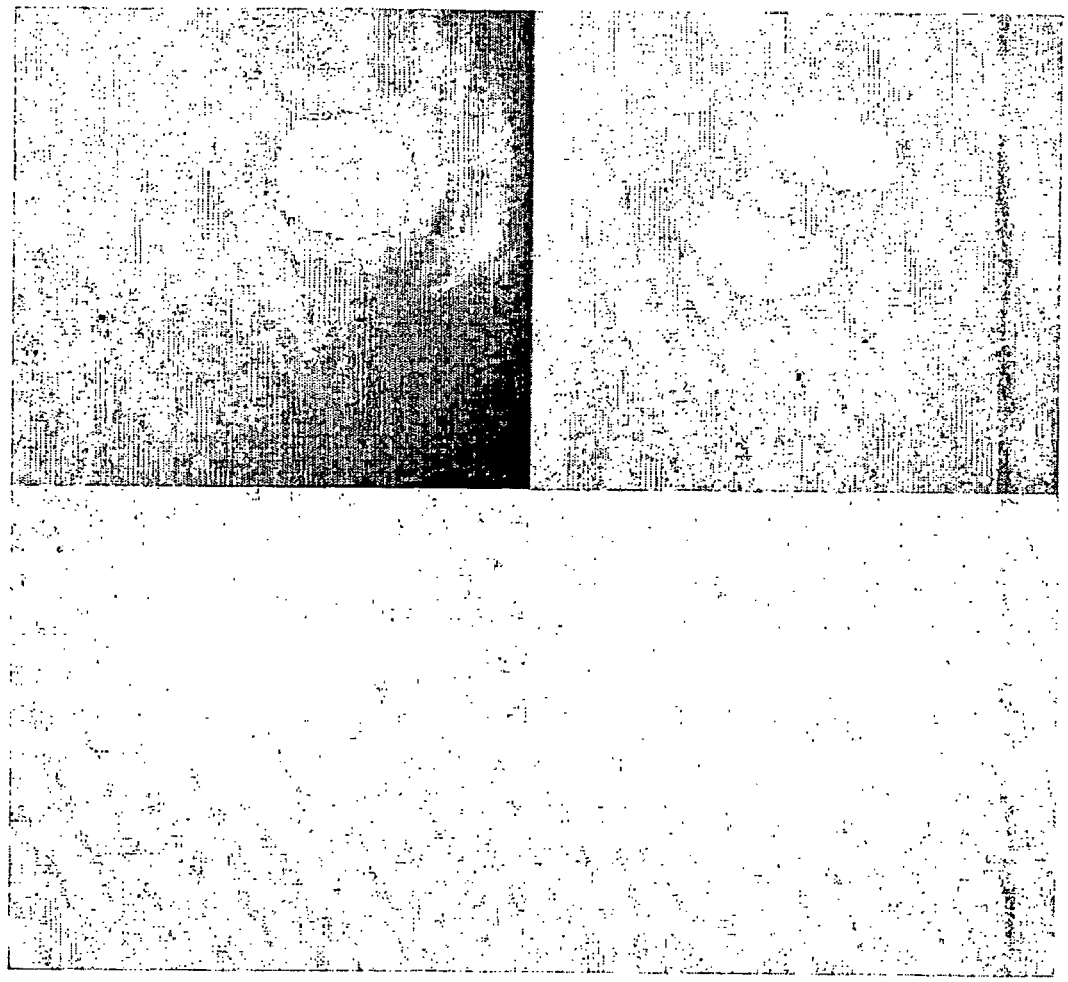

FIG. 17 illustrates the results when a 12 micron silica capillary approx 7 cm long was filled with polycrystalline Germanium semiconductor for mid-IR characterisation at Wright-Patterson Airforce Base. Here, a 1.064 μm CW Nd-YAG (Light Solutions Corp, CA) pumped periodically poled lithium niobate (PPLN) OPO was used for generating 3.258 μm wavelength idler beam with ~500 mW of power. A dielectric 1064 nm mirror was used at first for visible light alignment. This filter cuts out the 3.258 μm and 1064 nm beam, but allows the red light to pass through. After the initial alignment with red laser light the dielectric mirror was removed and replaced with a Ge-filter, which cuts out all wavelengths except the idler at 3.258 μm. Two ZnSe lenses with focal lengths of 19 mm were used to couple light into and out of the fiber. A pyroelectric camera (ElectroPhysics PV320) was used to image the output beams. The zeroth order mode as well as higher order modes can be seen in FIG. 15. Translating the fiber in the x-y plane perpendicular to the propagation direction activates the different modes, resulting in a Germanium mid-IR optical fibre waveguide. Some preliminary cut-back measurements suggest the limits for the propagation losses are between 0 and 93.3 μW for 31 mm propagation, or 0 to 0.332 μW/mm. This translates to a maximum upper limit of 0.7 dB/3.1 cm=0.23 dB/cm. The average loss is 19.8% of the loss (wrt power output from the 35 mm long fiber), or 0.432 dB/3 cm=0.14 dB/cm.

Figure 18:
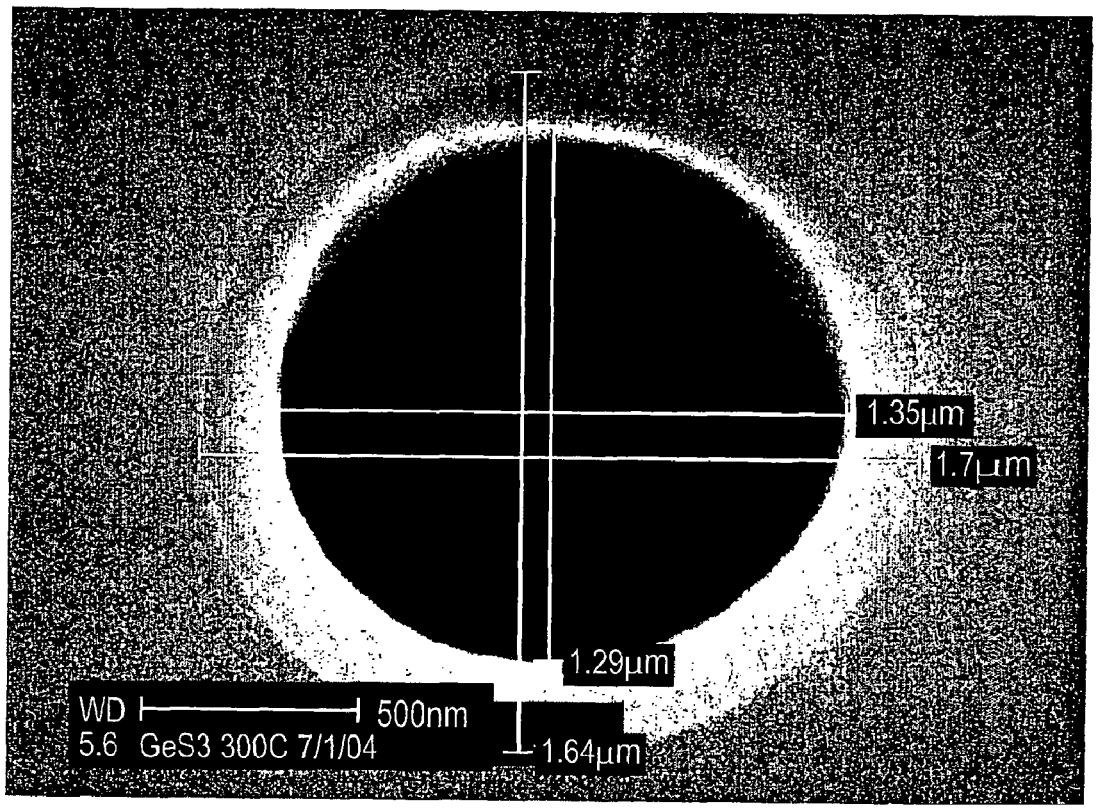

FIG. 18 illustrates Germanium sulphide semiconductor annularly deposited inside a 2 μm capillary fibre. The germanium sulphide is deposited by way of thermal decomposition of $GeH_4$ and $H_2S$. This shows the deposition of a bulk compound semiconductor within an optical fibre waveguide, thus leading the way towards the technologically important optoelectronic direct bandgap binary semiconductor systems such as GaAs, InAs etc.

Figure 19A:
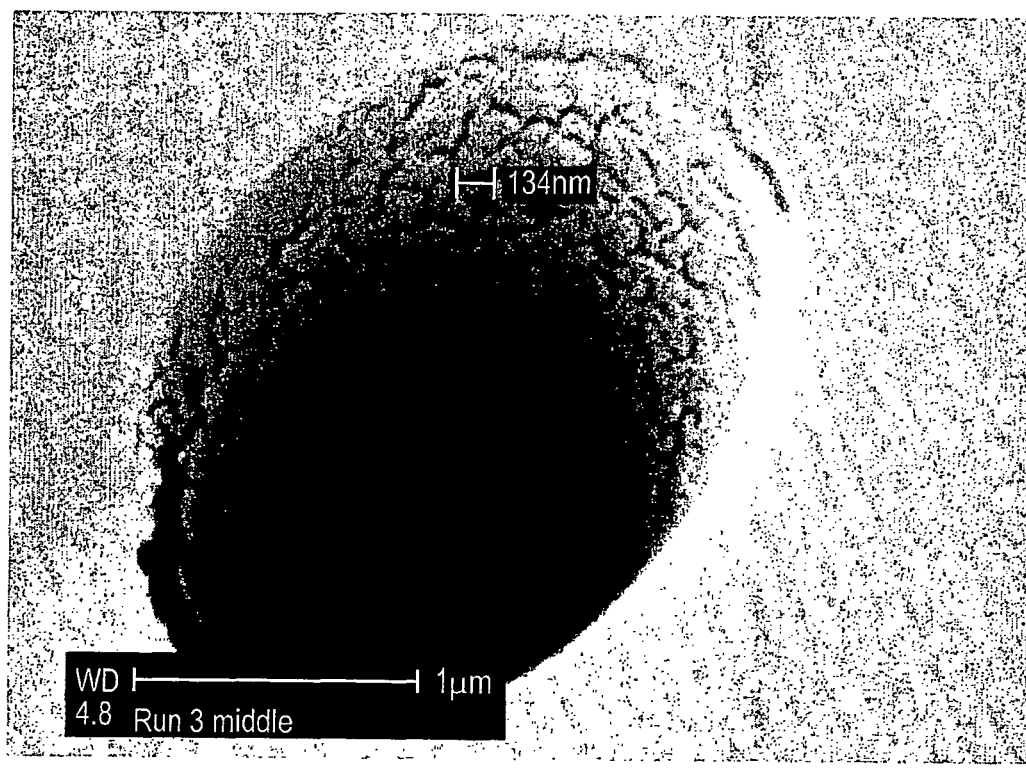
Figure 19B:
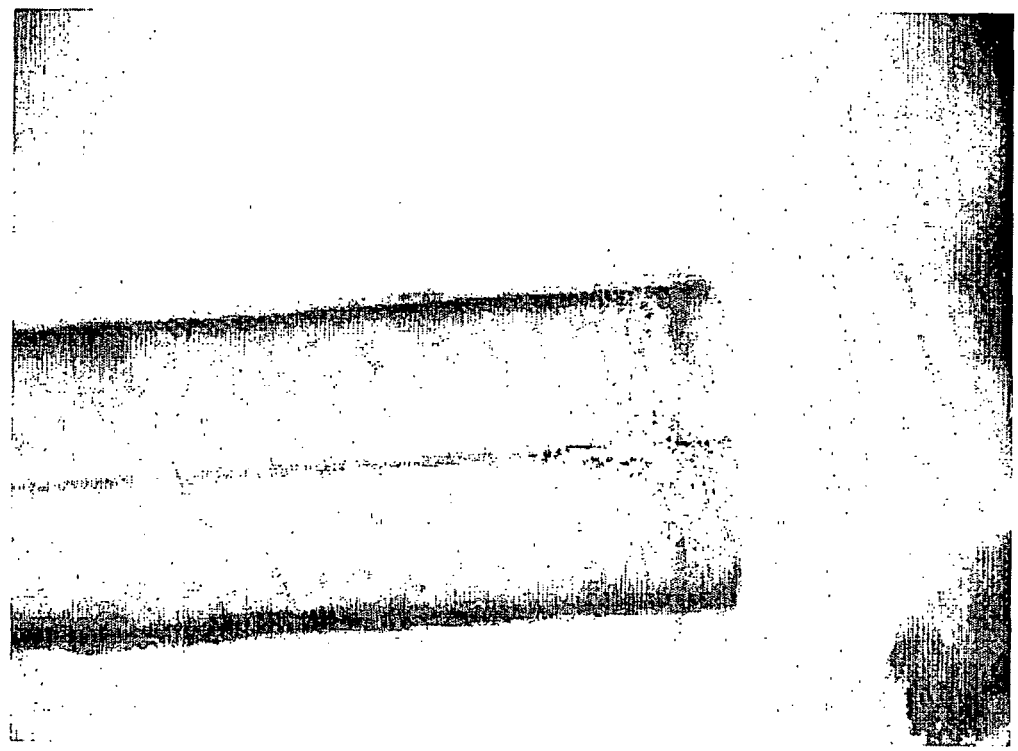
Figure 19C:
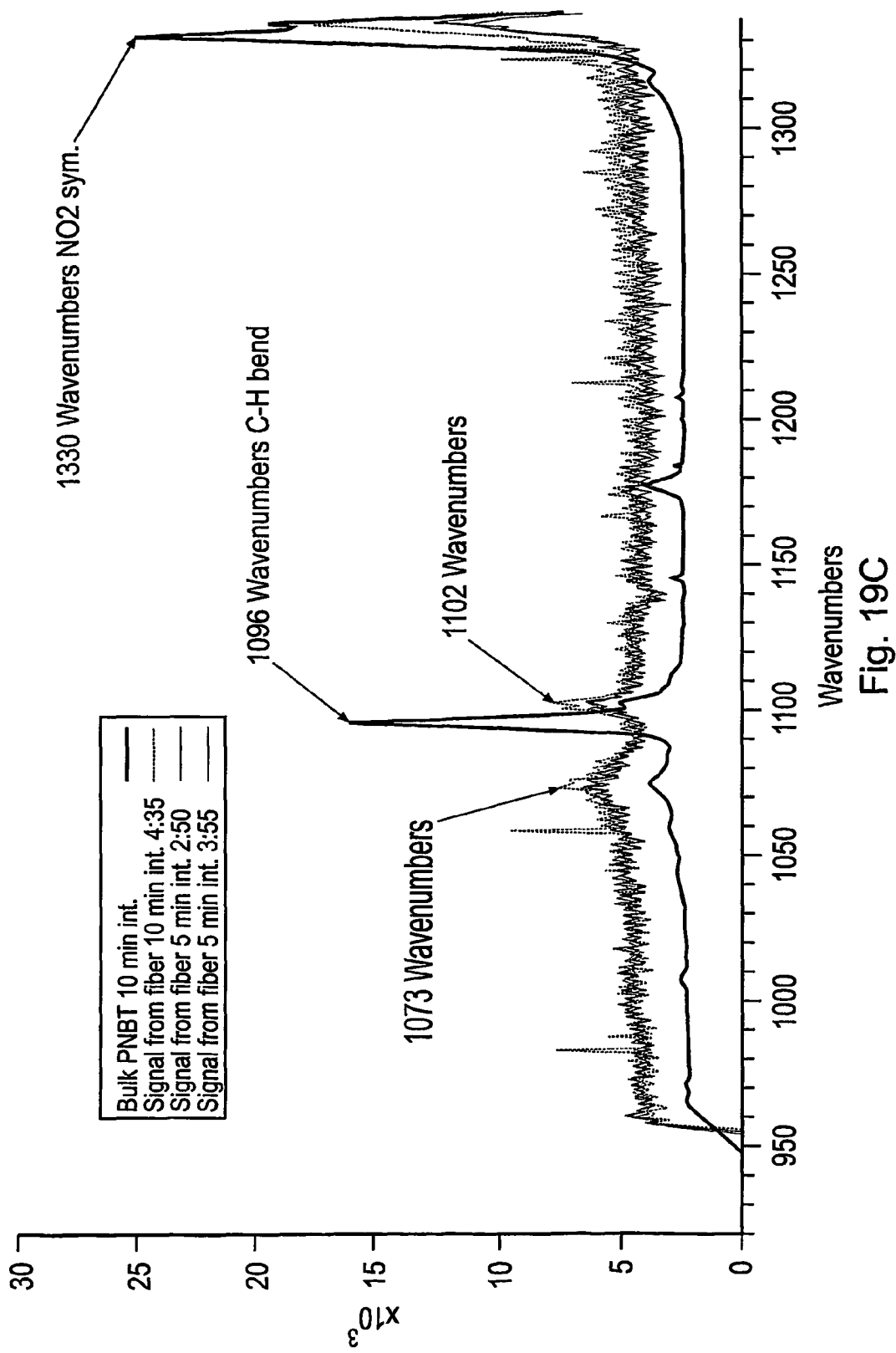

FIGS. 19A to 19C illustrate evidence of SERS inside a 2 μm capillary fibre. Raman spectra can be collected using 633 nm excitation (2 mW at sample) with a 40× objective and a five minute integration time. The figures show that the first non-noise spectrum was collected 2 hours and 35 minutes after the PNBT (paranitrobenzenethiol) is placed at the end of the capillary. Spectra are only taken every 30 min. to reduce heating of the fibre. The second image shows two peaks at 1073 and 1102 wavenumbers with roughly equal intensity when the spectrum is taken of the fibre. This is consistent with the observations of Skadtchenko and Aroca of SERS of PNBT on silver. The third image shows that the S-H signal is absent in the fibre sample, but observed in the bulk sample after PNBT is detected at 1330, 1073, and 1102 wavenumbers. This data indicates that the signal from the fibre is actually a SERS signal.

Creation of metamaterials by bonding is not limited to holey fibres. Metamaterials made from other engineered microstructured material samples can also be bonding. For example, planar samples may be bonded, either in a first direction to increase the planar extent, or in a perpendicular direction to build up layers of planar material. Planar and elongate samples may also be mixed.

Many different materials, and techniques for controlling the integration of the functional material into the microstructured material, have been presented. It is to be understood that these various features can be combined as desired, so as to allow fabrication of different metamaterials, made of different combinations of materials and with different physical structures.

References

[1] "Electrically stimulated light-induced second harmonic generation in glass: Evidence of coherent photoconductivity", PG Kazansky and V Pruneri, Phys. Rev. Lett. 78 p 2956 1997

[2] "Propagation of cold atoms along a miniature magnetic guide", M Key, I G Hughes, W Rooijakkers, B E Sauer, E A Hirids, D J Richardson and P G Kazansky, Phys. Rev. Lett 84 p 1371 2000

[3] US 2003/0035631 A1

[4] "Integrated fiber Mach-Zehnder interferometer for electro-optical switching", M Fokine, L E Nilsson, A Claesson, D Berlemont, L Kjellberg, L Krummenacher and W Margulis, Opt. Lett. 27 p 1643 2002

[5] "Lasing from semiconductor quantum rods in a cylindrical microcavity", M Kazes, D Y Lewis, Y Ebenstein, T Mokari and U Banin, Advanced Materials 14 p 317 2002

[6] "Enhancement of optical gain of semiconductors embedded in three-dimensional photonic crystals", Y A Vlasov, K Luterova, I Pelant, B Hönerlage and V N Astratov, Appl. Phys. Lett. 71 p 1616 1997

[7] "Chemical approaches to three dimensional semiconductor photonic crystals", D J Norris and Y A Vlasov, Adv. Mat. 13 p 371 2001

[8] "Fabrication inside microchannels using fluid flow", P J A Kenis, R F Ismagilov, S Takayama, G M Whitesides, S Li and H S White, Acc. Chem. Res. 33 p 841 2000

[9] "Control of thickness and orientation of solution-grown silicon nanowires", J D Holmes, K P Johnson, R C Doty and B A Korgel, Science 287 p 1471 2000

[10] "The formation of dimensionally ordered silicon nanowires within mesoporous silica", N R B Coleman, M A Morris, T R Spalding and J D Holmes, J. Am. Chem. Soc. 123 p 187 2001

[11] WO 01/32952 A2

The invention claimed is:

1. A method of fabricating a metamaterial comprising:
providing a sample of engineered microstructured material comprising one or more voids and configured to transmit electromagnetic radiation;
providing a high pressure fluid comprising at least one functional material carried in at least one carrier fluid;
passing the high pressure fluid through the one or more voids; and
causing the functional material to integrate into the engineered microstructured material to form the metamaterial;
wherein the one or more voids have a smallest dimension between 1 nm and 1 μm.

2. A method according to claim 1, in which the carrier fluid is in its supercritical phase.

3. A method according to claim 1, in which the high pressure fluid has a pressure of 1 MPa or above, or of 2.5 MPa or above, or of 5 MPa or above, or of 10 MPa or above, or of 25 MPa or above, or of 50 MPa or above, or of 100 MPa or above, or of 500 MPa or above, or of 1000 MPa or above, or of 2000 MPa or above.

4. A method according to claim 1, in which the one or more voids have a length and a width such that the ratio of the length to the width is in the range 1:1 to 10:1, or 1:1 to 100:1, or 1:1 to 1000:1, or 1:1 to 10000:1, or 1:1 to 100000:1, or 1:1 to $10^6$:1, or 1:1 to $10^7$:1, or 1:1 to $10^8$:1, or 1:1 to $10^9$:1, or 1:1 to $10^{10}$:1, or 1:1 to $10^{11}$:1, or 1:1 to $10^{12}$:1 or 10:1 to 100:1, or 10:1 to 1000:1, or 10:1 to 10000:1, or 10:1 to 100000:1, or 10:1 to $10^6$:1, or 10:1 to $10^7$:1, or 10:1 to $10^8$:1, or 10:1 to $10^9$:1, or 10:1 to $10^{10}$:1, or 10:1 to $10^{11}$:1, or 10:1 to $10^{12}$:1 or 100:1 to 1000:1, or 100:1 to 10000:1, or 100:1 to 100000:1, or 100:1 to $10^6$:1, or 100:1 to $10^7$:1, or 100:1 to $10^8$:1, or 100:1 to $10^9$:1, or 100:1 to $10^{10}$:1, or 100:1 to $10^{11}$:1, or 100:1 to $10^{12}$:1 or 1000:1 to 10000:1, or 1000:1 to 100000:1, or 1000:1 to $10^6$:1, or 1000:1 to $10^7$:1, or 1000:1 to $10^8$:1, or 1000:1 to $10^9$:1, or 1000:1 to $10^{10}$:1, or 1000:1 to $10^{11}$:1, or 1000:1 to $10^{12}$:1 or 10000:1 to 100000:1, or 10000:1 to $10^6$:1, or 10000:1 to $10^7$:1, or 10000:1 to $10^8$:1, or 10000:1 to $10^9$:1, or 10000:1 to $10^{10}$:1, or 10000:1 to $10^{11}$:1, or 10000:1 to $10^{12}$:1.

5. A method according to claim 1, in which the one or more voids have a width in the range 1 nm to 100 nm.

6. A method according to claim 1, in which the sample of microstructured material is longer in length than width and the one or more voids comprises one or more holes that are longer in length than width and run along the length of the sample of microstructured material.

7. A method according to claim 6, in which the sample of microstructured material comprises a holey optical fibre.

8. A method according to claim 1, in which the sample of microstructured material is planar.

9. A method according to claim 1, in which the engineered microstructured material, the at least one functional material and dimensions of the one or more voids are selected to give a metamaterial that is a mesomaterial.

10. A method according to claim 1, in which the sample of microstructured material is fabricated from one or more of: glass materials, plastics materials, ceramic materials, semiconductor materials and metallic materials.

11. A method according to claim 1, in which the functional material comprises one or more of: metals, metal oxides, dielectric materials, superconductor materials, magnetic materials, ceramic materials, polymers, and biological materials.

12. A method according to claim 1, in which causing the functional material to integrate into the engineered microstructured material comprises causing the functional material to deposit on a surface of the one or more voids.

13. A method according to claim 12, in which the functional material is deposited to form one or more nanoparticles on a surface of the one or more voids.

14. A method according to claim 12, and further comprising providing a further high pressure fluid comprising a further functional material and passing the further high pressure fluid through the one or more voids to cause the further functional material to deposit on the functional material previously deposited.

15. A method according to claim 12, in which the functional material is deposited on a surface of the one or more voids until the one or more voids is substantially filled with the functional material.

16. A method according to claim 12, in which the functional material is deposited to create one or more quantum structures.

17. A method according to claim 1, in which the one or more voids comprise two or more voids, and passing the high pressure fluid through the one or more voids comprises passing the high pressure fluid through one or some of the two or more voids.

18. A method according to claim 17, and further comprising filling the one or more voids through which the high pressure fluid is not passed with an inert pressurised fluid to substantially equalise forces within the engineered microstructured material during passing of the high pressure fluid.

19. A method according to claim 1, in which the one or more voids comprises two or more voids, the method further comprising blocking a first selection of one or some of the voids to prevent passing of the high pressure fluid so that integration of the functional material does not occur for the first selection of voids.

20. A method according to claim 19, and subsequently comprising blocking a second selection of one or some of the voids before passing a further high pressure fluid through the one or more voids, so that integration of the functional material does not occur for the second selection of voids.

21. A method according to claim 20, and subsequently comprising blocking further selections of one or some of the voids and passing further high pressure fluids until a desired metamaterial is achieved.

22. A method according to claim 20, in which the further high pressure fluid or fluids comprise a functional material or materials different from the said functional material comprised in the said high pressure fluid.

23. A method according to claim 19, in which blocking one or some of the voids comprises covering openings of the voids with a mask material and using photolithographic patterning of the mask material to unblock a selected one or more voids.

24. A method according to claim 19, in which blocking one or some of the voids comprises filling the one or some of the voids with a pressurised fluid.

25. A method according to claim 1, in which causing the functional material to integrate into the engineered microstructured material comprises heating the high pressure fluid as it passes through the one or more voids to cause the functional material to separate from the carrier fluid and integrate into the engineered microstructured material.

26. A method according to claim 25, comprising heating the high pressure fluid by heating selected portions of the sample for selected durations to control an amount of functional material that becomes integrated.

27. A method according to claim 25, in which heating the high pressure fluid comprises applying a temperature gradient along all or part of the sample.

28. A method according to claim 27, in which the temperature gradient is dynamically varying.

29. A method according to claim 27, in which the temperature gradient is static.

30. A method according to claim 25, in which heating the high pressure fluid comprises heating a portion of the sample to create a heated zone, and moving the heated zone along the sample to integrate the functional material sequentially along all or part of the sample.

31. A method according to claim 30, and further comprising implanting a plug of alloy-forming material in the one or more voids before passing the high pressure fluid through the one or more voids, passing the high pressure fluid through the one or more voids and allowing an alloy to form from the functional material and the alloy-forming material in the heated zone, the alloy depositing the functional material in response to the heat.

32. A method according to claim 1, in which causing the functional material to integrate into the engineered microstructured material comprises altering the pressure of the high pressure fluid as it passes through the one or more voids to cause the functional material to separate from the carrier fluid and integrate into the engineered microstructured material.

33. A method according to claim 1, in which causing the functional material to integrate comprises applying a pressure gradient along all or part of the sample as the high pressure fluid is passed through the one or more voids.

34. A method according to claim 1, in which causing the functional material to integrate comprises applying a gradient in concentration of the functional material in the high pressure fluid along all or part of the sample as the high pressure fluid is passed through the one or more voids.

35. A method according to claim 1, in which causing the functional material to integrate into the engineered microstructured material comprises providing a carrier fluid that can diffuse through the engineered microstructured material, and allowing the carrier fluid to diffuse through walls of the one or more voids to leave the functional material within the one or more voids.

36. A method according to claim 35, in which the carrier fluid can further diffuse through the integrated functional material.

37. A method according to claim 1, in which the functional material has a precursor form in the high pressure fluid, and causing the functional material to integrate comprises decomposing the precursor into the functional material and a by-product that can diffuse through the engineered microstructured material and allowing the by-product to diffuse through walls of the one or more voids.

38. A method according to claim 1, in which causing the functional material to integrate into the engineered microstructured material comprises providing a functional material that will integrate into the engineered microstructured material when exposed to energy, and exposing the high pressure fluid to energy as it passes through the one or more voids.

39. A method according to claim 38, comprising exposing the high pressure fluid to a spatially varying pattern of energy to cause spatially varying integration of the functional material.

40. A method according to claim 38, comprising exposing the high pressure fluid to a temporally varying pattern of energy to cause spatially varying integration of the functional material.

41. A method according to claim 38, in which the energy comprises electromagnetic radiation.

42. A method according to claim 1, in which causing the functional material to integrate into the engineered microstructured material comprises providing a functional material that is a monomer, and providing conditions within the one or more voids under which the monomer polymerises while passing the high pressure fluid through the one or more voids to cause formation of a polymer within the one or more voids.

43. A method according to claim 1, in which causing the functional material to integrate into the engineered microstructured material comprises providing a functional material that bonds with the engineered microstructured material when brought into contact by the carrier fluid.

44. A method according to claim 1, in which causing the functional material to integrate into the engineered microstructured material comprises providing a functional material that will grow from a seed, and incorporating a seed into the one or more voids so that the functional material will grow within the one or more voids as the high pressure fluid passes through the one or more voids.

45. A method according to claim 1, in which causing the functional material to integrate comprises applying one or more integration-causing conditions to the sample that vary along a gradient over all or part of the sample.

46. A method of fabricating a metamaterial comprising:
providing a sample of engineered microstructured material comprising one or more voids and configured to transmit electromagnetic radiation;
providing a high pressure fluid comprising at least one functional material carried in at least one carrier fluid;
passing the high pressure fluid through the one or more voids; and
causing the functional material to integrate into the engineered microstructured material to form the metamaterial;
wherein causing the functional material to integrate into the engineered microstructured material comprises causing the functional material to deposit on a surface of the one or more voids; and
wherein the functional material is deposited to form an annular layer on a surface of the one or more voids.

47. A method according to claim 46, further comprising controlling the amount of functional material that is deposited to form an annular layer of a selected thickness.

48. A method according to claim 47, in which the thickness of the annular layer is selected to reduce the width of the one or more voids to a selected size.

49. A method according to claim 48, and further comprising providing a further high pressure fluid comprising a further functional material and passing the further high pressure fluid through the one or more voids to cause the further functional material to deposit on the functional material previously deposited, in which the selected size of the one or more voids is such as to cause quantum confinement in the deposited further functional material.

50. A method according to claim 46, in which the annular layer comprises a thin film.

51. A method of fabricating a metamaterial comprising:
providing a sample of engineered microstructured material comprising one or more voids and configured to transmit electromagnetic radiation;
providing a high pressure fluid comprising at least one functional material carried in at least one carrier fluid;
passing the high pressure fluid through the one or more voids; and
causing the functional material to integrate into the engineered microstructured material to form the metamaterial; and
further comprising fabricating one or more further metamaterials by providing a further sample of engineered microstructured material comprising one or more voids and configured to transmit electromagnetic radiation;
providing high pressure fluid comprising at least one functional material carried in at least one carrier fluid;
passing the high pressure fluid through the one or more voids; and
causing the functional material to integrate into the engineered microstructured material to form a further metamaterial., and
bonding the metamaterials together to create a final metamaterial.

52. A method according to claim 51, in which at least two of the metamaterials are different.

* * * * *